May 21, 1929.  T. CARROLL  1,713,741

CASH REGISTER

Filed Dec. 5, 1921  14 Sheets-Sheet 1

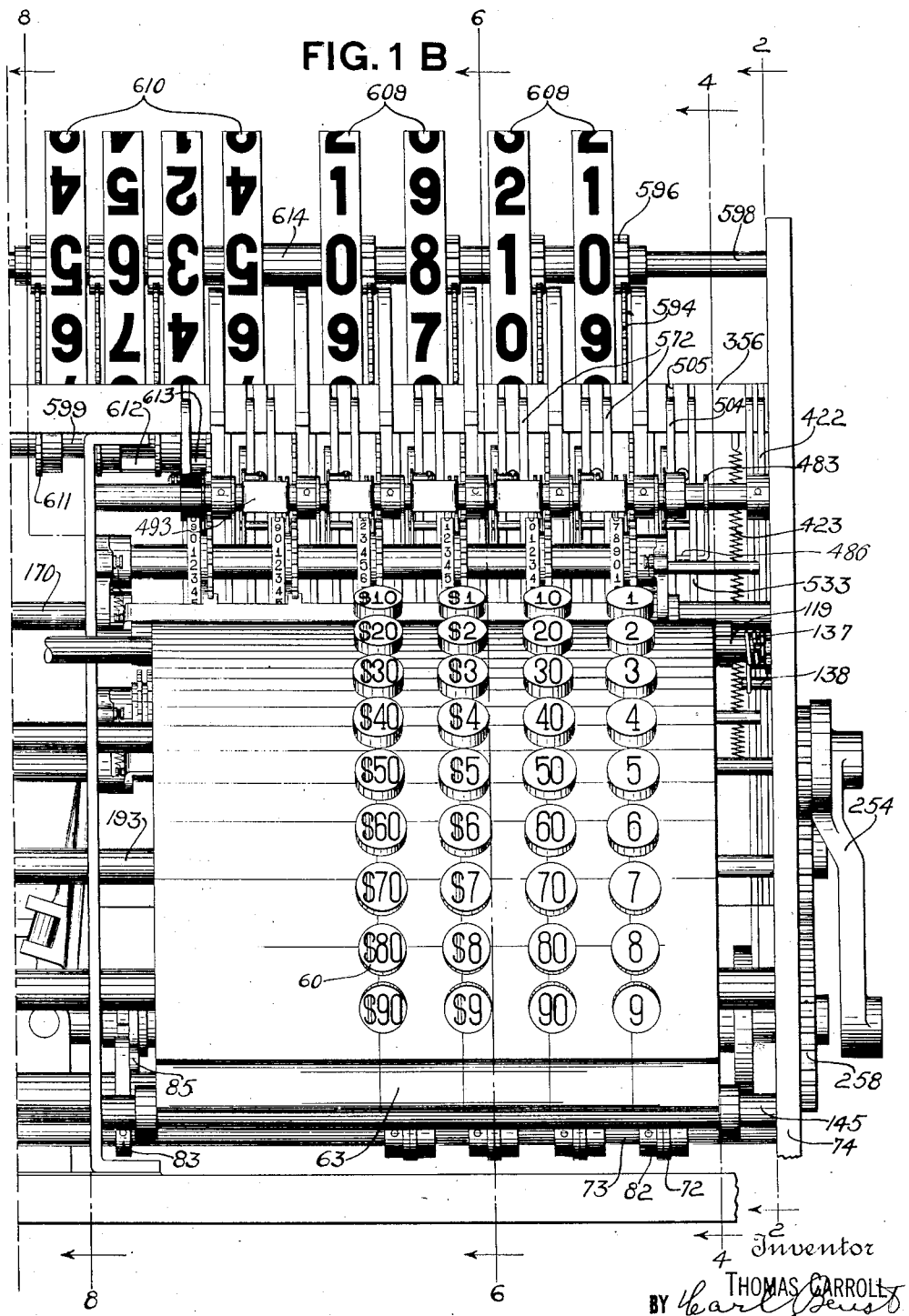

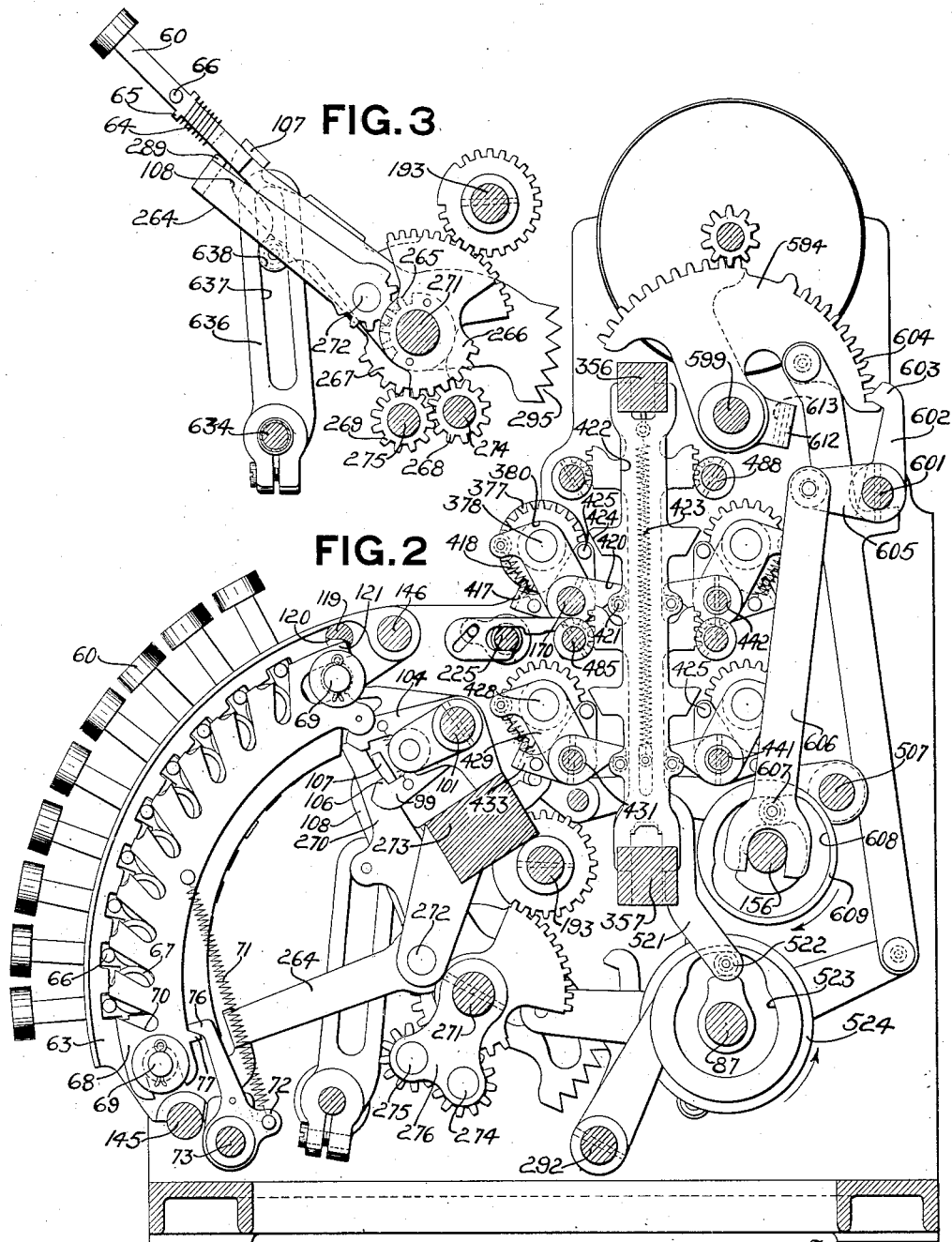

May 21, 1929.　　　T. CARROLL　　　1,713,741
CASH REGISTER
Filed Dec. 5, 1921　　　14 Sheets-Sheet 4
FIG. 5
FIG. 4
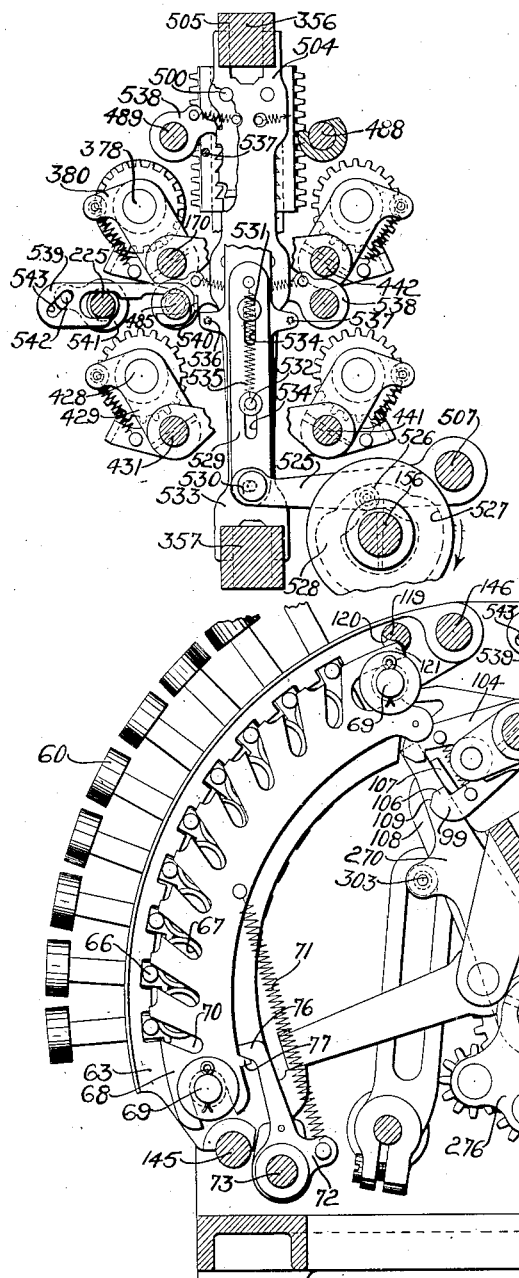
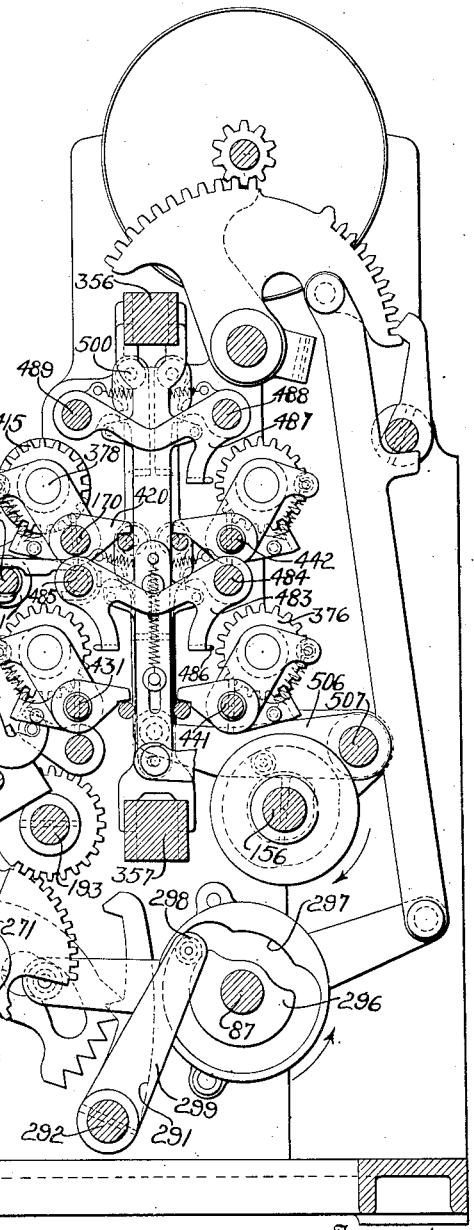
Inventor
THOMAS CARROLL
BY
His Attorneys May 21, 1929.
T. CARROLL
1,713,741
CASH REGISTER
Filed Dec. 5, 1921
14 Sheets-Sheet 5
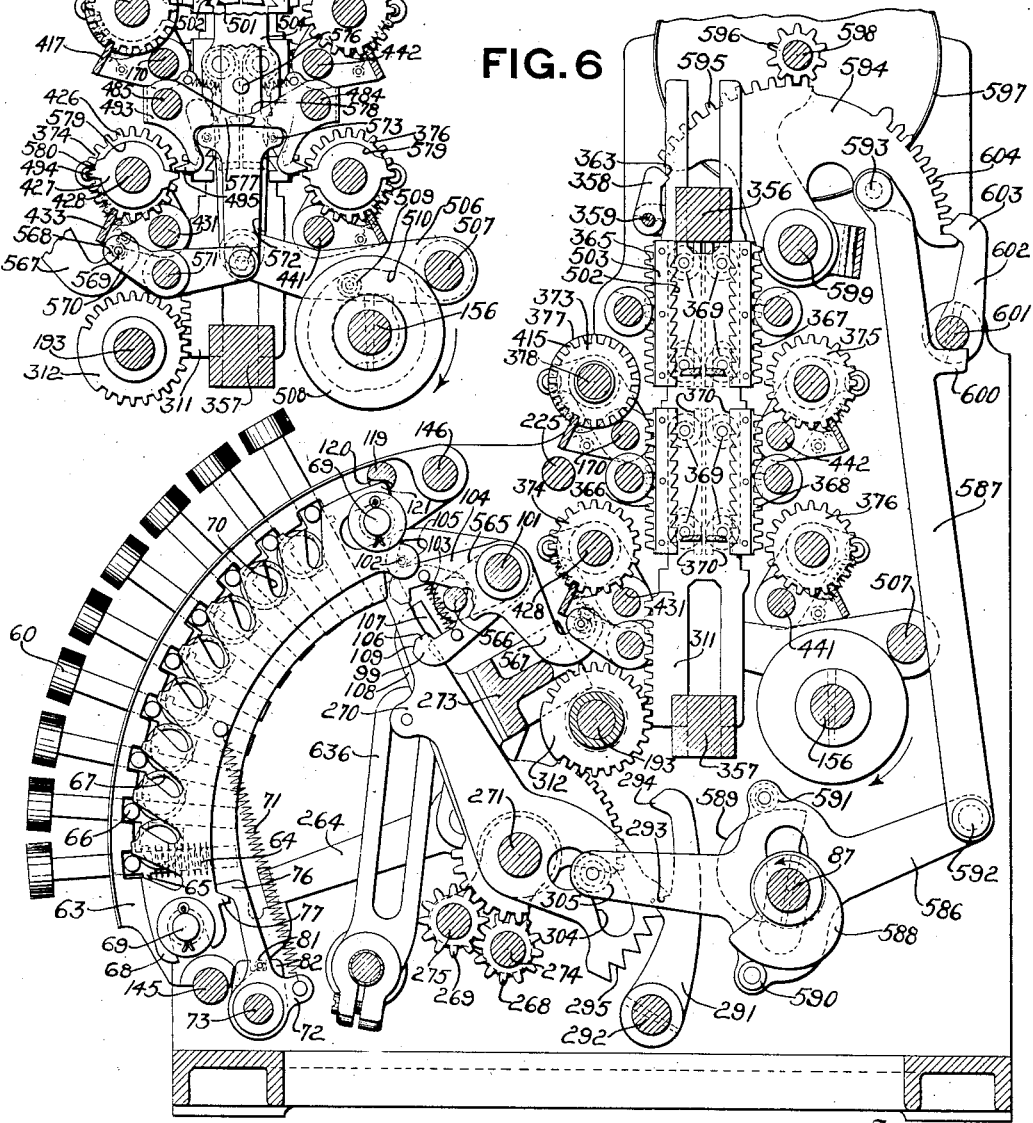
Inventor
THOMAS CARROLL
BY Earl Beust
Henry E. Stauffer
His Attorneys

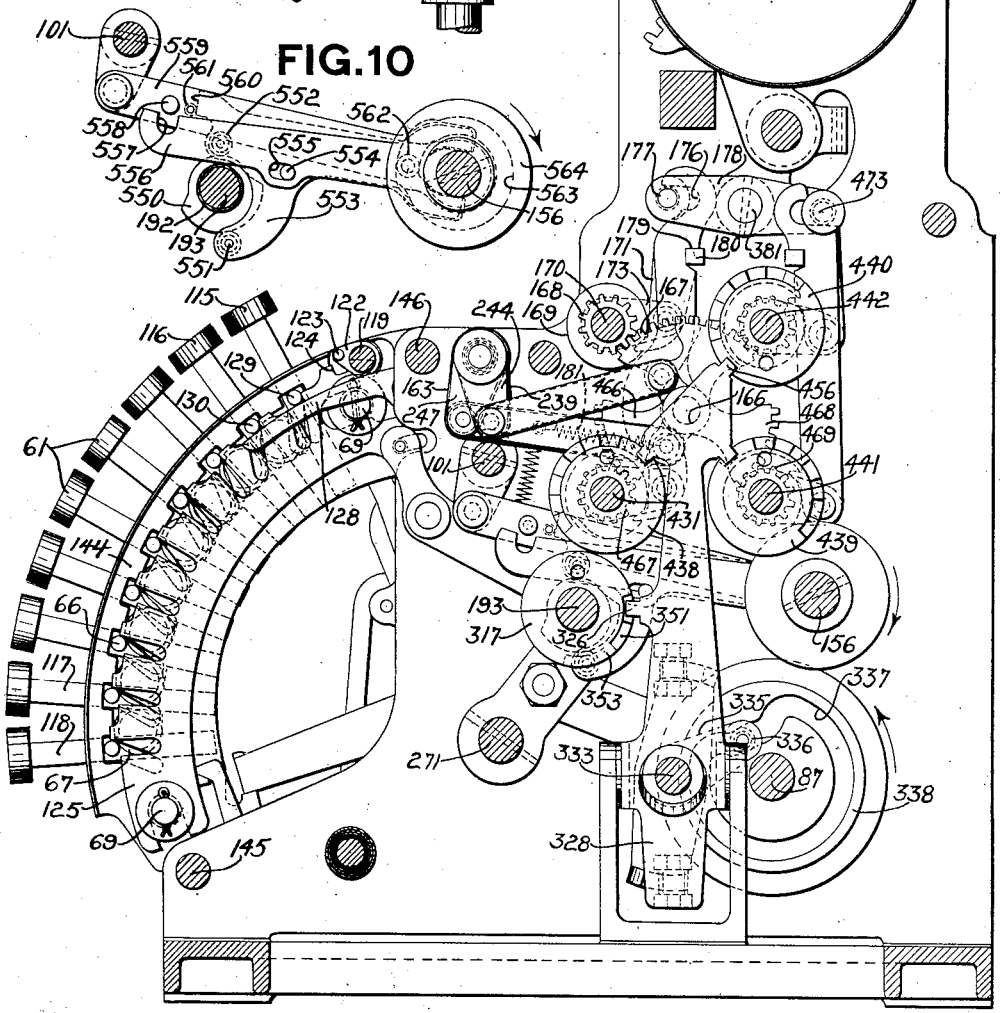

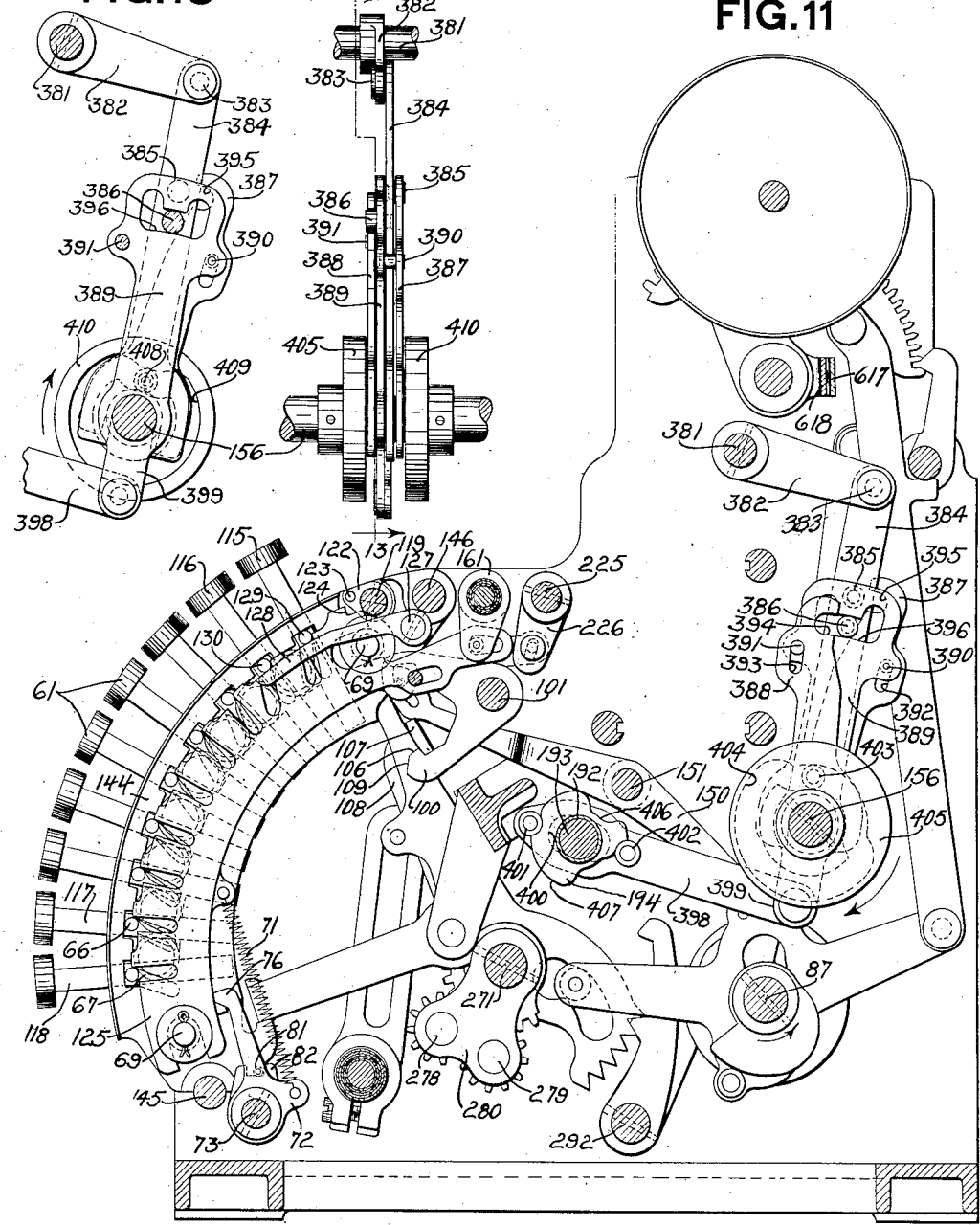

May 21, 1929.   T. CARROLL   1,713,741
CASH REGISTER
Filed Dec. 5, 1921   14 Sheets-Sheet 8

May 21, 1929.     T. CARROLL     1,713,741
CASH REGISTER
Filed Dec. 5, 1921     14 Sheets-Sheet 9

Inventor
THOMAS CARROLL
BY *Earl Berst*
*Henry E. Stauffer*
His Attorneys

May 21, 1929.  T. CARROLL  1,713,741
CASH REGISTER
Filed Dec. 5, 1921   14 Sheets-Sheet 10

Inventor
THOMAS CARROLL
BY Carl Beust
Henry E Stauffer
His Attorneys

May 21, 1929.　　　　T. CARROLL　　　　1,713,741
CASH REGISTER
Filed Dec. 5, 1921　　14 Sheets-Sheet 11
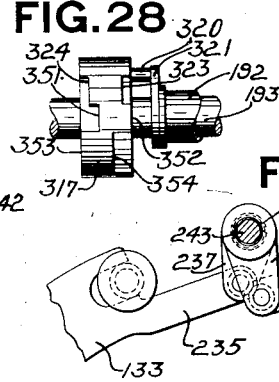
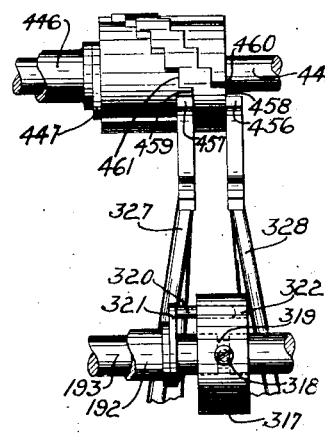
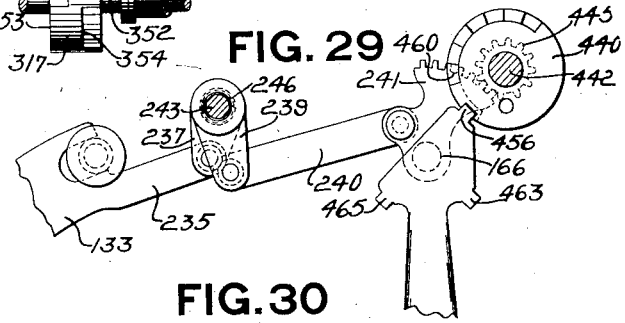
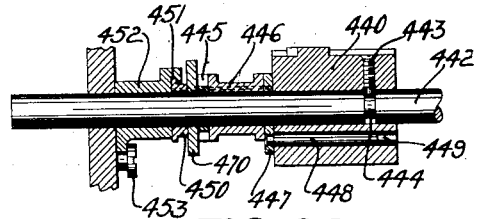
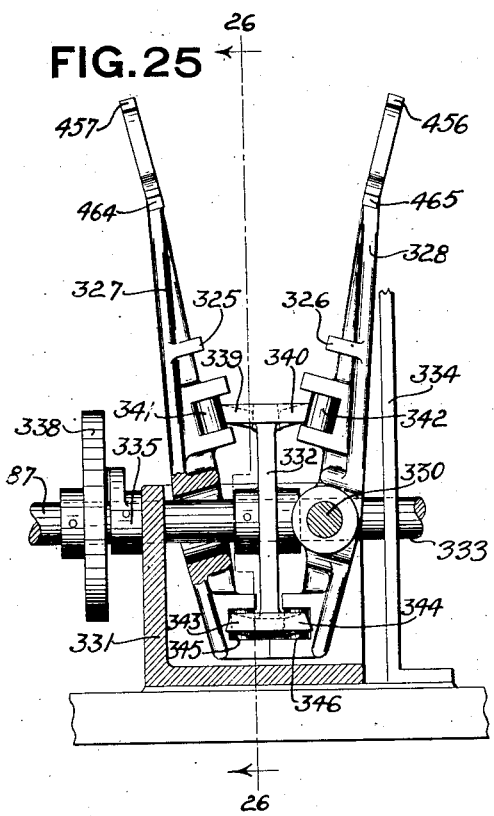
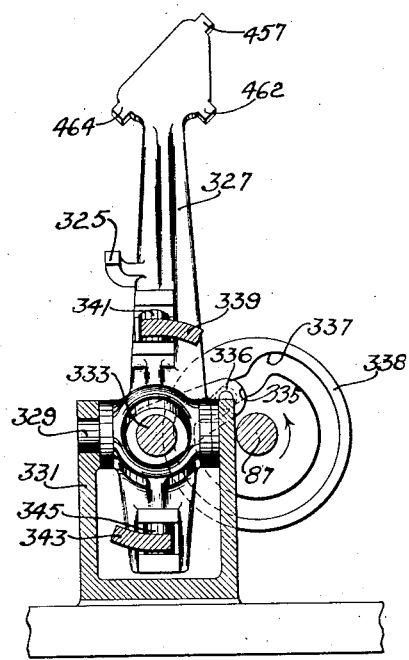
Inventor
THOMAS CARROLL May 21, 1929.    T. CARROLL    1,713,741
CASH REGISTER
Filed Dec. 5, 1921    14 Sheets-Sheet 12
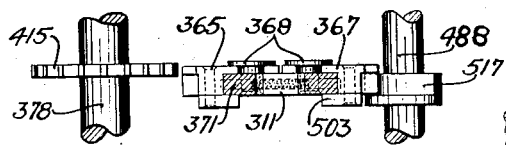
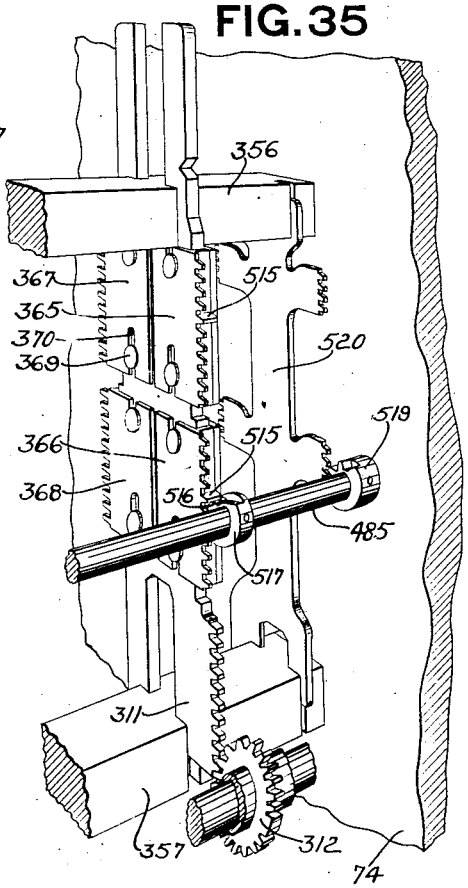
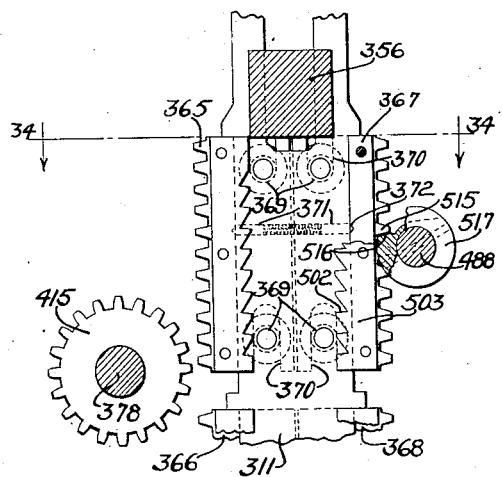
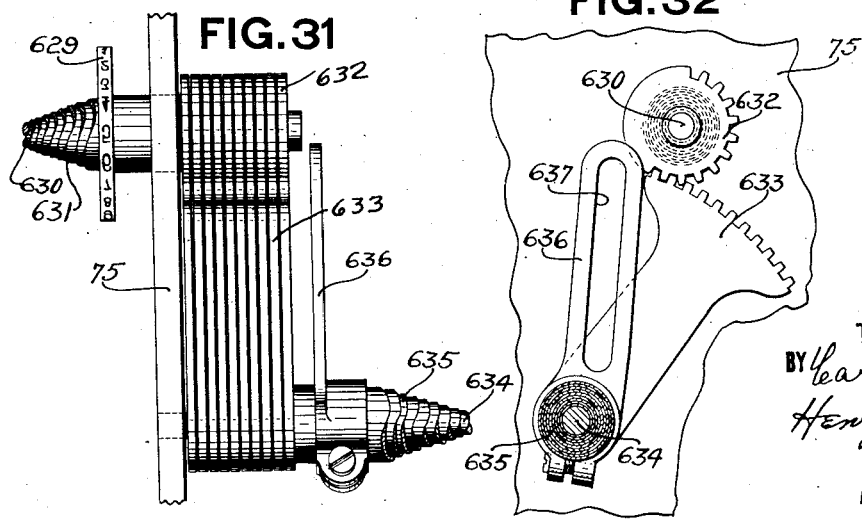

May 21, 1929.  T. CARROLL  1,713,741
CASH REGISTER
Filed Dec. 5, 1921   14 Sheets-Sheet 13
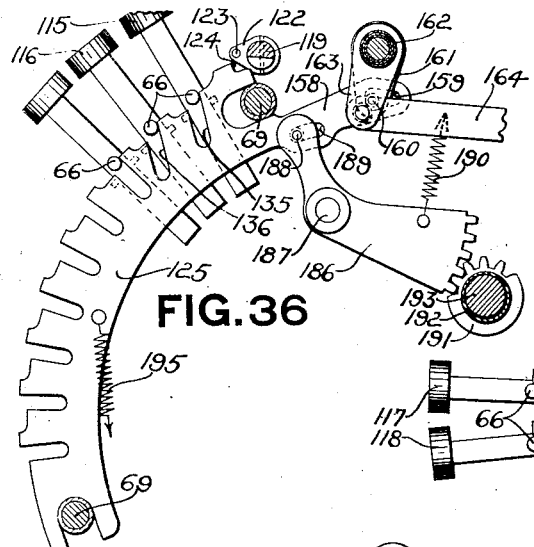
FIG. 36
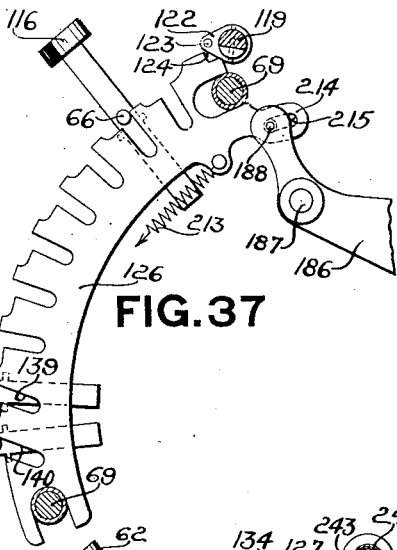
FIG. 37
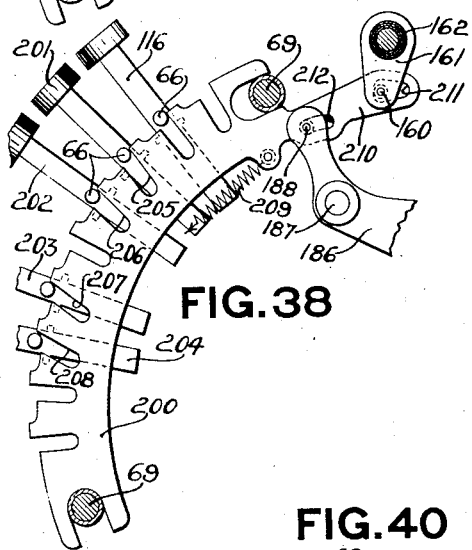
FIG. 38
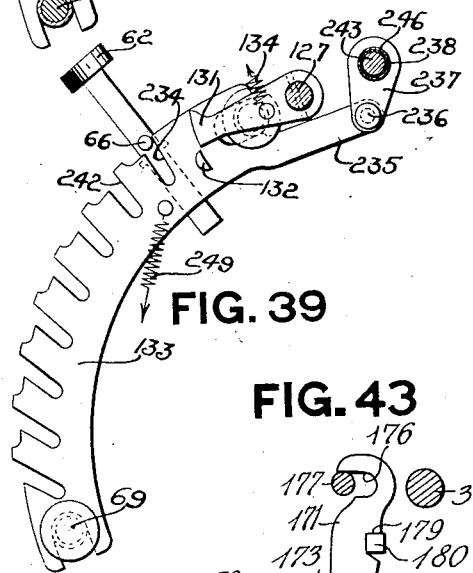
FIG. 39
FIG. 43
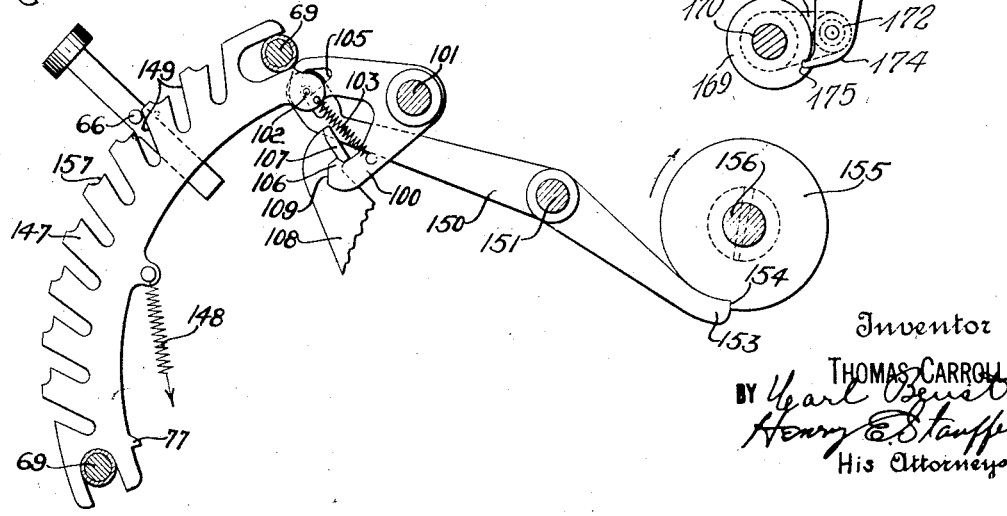
FIG. 40
Inventor
THOMAS CARROLL
BY Earl Brust
Henry E. Stauffer
His Attorneys May 21, 1929.　　T. CARROLL　　1,713,741
CASH REGISTER
Filed Dec. 5, 1921　　14 Sheets-Sheet 14

Inventor
THOMAS CARROLL
BY
His Attorneys

Patented May 21, 1929.

1,713,741

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed December 5, 1921. Serial No. 520,106.

This invention relates to cash registers and in particular to the class of multiple totalizer registers known as department registers, wherein it is desirable to totalize entries according to their classes as well as to accumulate their grand total, to print entries and totals on a record strip or sales slip and upon an issuing receipt, and to display said entries by indicators.

One object of this invention is to provide a simplified form of differential mechanism consisting of complementary movable members controlled by press-in keys, to add items on a grand totalizer together with any one of several department totalizers.

Another object of the invention is to provide a simple and positive mechanism for substracting items from the grand totalizer together with any one of several department totalizers by rotating the wheels of the totalizers in the same direction as when adding items. This is accomplished by having a differentially timed mechanism for connecting the actuators with the totalizer wheels.

Another object is to provide mechanism for printing the various items as they are registered and also the totals on the totalizers when desired. The type carriers are connected positively to the differential mechanism which is normally controlled by the press-in keys, but which during total printing is controlled by the totalizer wheels so that the rotation of the totalizer wheels forward to their "nine" positions at a totalizing operation will carry the type carriers away from their zero position a number of divisions corresponding to the amounts on said wheels.

Another object of the invention is to provide mechanism for printing the sub-totals shown by the various totalizers. After the printing is accomplished the totalizer wheels are restored to their former positions corresponding to the items printed.

Another object of this invention is to provide a simple and positive selecting mechanism for the various totalizers, controlled by the press-in keys.

Still another object of this invention is to provide a simple and positive interlocking mechanism between the keys of the control bank and the keys of the amount banks and department of clerks' banks.

With these and incidental objects in view, the invention consists in certain novel features of construction and combinations of parts, the essential elements of which are set forth in appended claims and a preferred form or embodiment of which is hereinafter described with reference to the drawings which accompany and form part of this specification.

Of said drawings:—

Figs. 1$^A$ and 1$^B$ taken together constitute a front elevation of the machine with the cabinet removed.

Fig. 2 is a transverse section of the machine taken on line 2—2 of Fig. 1$^B$.

Fig. 3 is a detail view of the differential mechanism shown in engagement with a depressed key in a partially operated position.

Fig. 4 is a transverse section of the machine taken on line 4—4 of Fig. 1$^B$.

Fig. 5 is a detail view of the first bank totalizer transfer mechanism shown in Fig. 4.

Fig. 6 is a transverse section of the machine taken on line 6—6 of Fig. 1$^B$.

Fig. 7 is a detail view of the totalizer transfer mechanism.

Fig. 8 is a transverse section of the machine taken on line 8—8 of Fig. 1$^B$.

Fig. 9 is a detail plan view of the lever segment latch control.

Fig. 10 is an elevation of the mechanism shown in Fig. 9.

Fig. 11 is a transverse section of the machine taken on line 11—11 of Fig. 1$^A$.

Fig. 12 is a detail rear elevation of a part of the totalizer engaging mechanism.

Fig. 13 is a sectional view taken on line 13—13 of Fig. 12.

Fig. 25 is a detail view of the department totalizers shifting mechanism.

Fig. 26 is a sectional view on the line 26—26 of Fig. 25.

Fig. 27 is a detail view of the selecting drum for the upper rear totalizer.

Fig. 28 is a detail view of the totalizer actuating bar pinion shifting drum.

Fig. 29 is a detail view of the selecting drum operating mechanism for the upper rear totalizer.

Fig. 30 is a detail sectional view of part of the selecting mechanism for the upper rear totalizer.

Fig. 31 is a detail view of the type wheel mechanism.

Fig. 32 is a side elevation of the mechanism shown in Fig. 31.

Fig. 33 is a full size detail view of one of the actuating racks and a part of the transfer plate.

Fig. 34 is a section taken on line 34—34 of Fig. 33.

Fig. 35 is a perspective view of one of the actuating rack carrying plates and rack restoring mechanism.

Fig. 36 is a detail view of the key detent in the control bank for shifting certain mechanism to position peculiar to the grand total and sub-total operations.

Fig. 37 is a detail view of the key detent in the control bank for shifting certain mechanism to the positions peculiar to the totalizing and sub-totalizing operations.

Fig. 38 is a detail view of the detent in the control bank for controlling various mechanism in the adding and subtracting operations.

Fig. 39 is a detail view of the detent for selecting counters in the clerks' banks.

Fig. 40 is a detail view of the regular key detent for the control bank, together with the machine lock and lever latch.

Fig. 42 is a detail view showing part of the totalizer mechanism of the wheels of the highest order.

Fig. 43 is a detail view showing part of the totalizer engaging mechanism shown in Fig. 19.

Figure 1A:
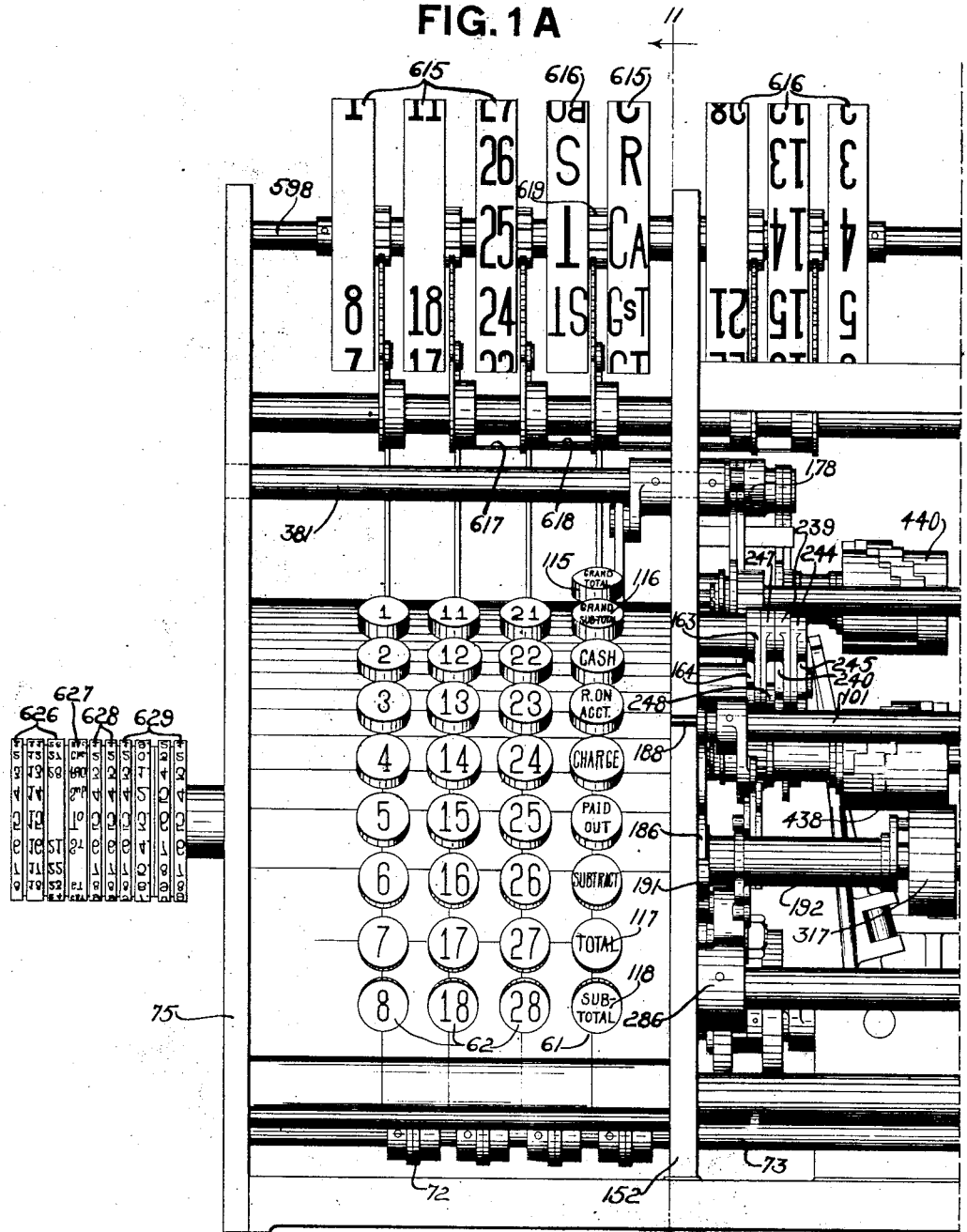

The machine includes various mechanisms, namely, the keyboard, driving mechanism, differential mechanism, one grand totalizer and a plurality of department or clerks' totalizers, indicating mechanism, printing mechanism for printing on a detail strip and an issuing receipt but which may be employed equally as well for printing on inserted slips, and finally, devices employed in the printing of totals and sub-totals.

The keyboard comprises a plurality of banks of amount keys, a plurality of department or clerks' banks, and one bank of control keys including keys for printing a total and sub-total from the grand totalizer, keys for printing a total and sub-total from each departmental or clerk's totalizer, a subtracting key for subtracting items from both the grand totalizer and the department totalizers, and the usual cash, rec'd on account, charge and paid out keys.

The driving mechanism includes mainly two main driving shafts with gear connections whereby these shafts may be caused to make one rotation by two rotations of a crank.

The differential mechanism includes a plurality of pairs of differentially movable pivoted members on which are mounted two sets of gear segments, one for operating the totalizing devices in addition and the other in subtraction. The members of each pair are movable toward each other, the sum of the movements of the members of each pair being constant. There is one pair of members for each bank of keys and where there are more numeral wheels in the totalizer than there are banks of amount keys, there is a pair of pivoted members for each of these wheels for total printing purposes.

In a regular registering operation of the machine, the keys control the relative movement of the pivoted members so that upon movement of the pivoted members one of them actuates to the desired extent the corresponding element or elements in totalizing devices.

The pivoted members of each pair are driven in opposite directions by planetary gears driven by an oscillating shaft operated by a cam and are provided with formed ears which engage with the depressed keys and thereby stop the movement of these members. The ears on the two members are so located relative to each other that when the one ear engages with a key the corresponding ear on the other member will not engage the key until the total movement of the two members amounts to some predetermined and constant value. Thus, if one member is stopped after having made one unit of movement its companion member will not engage the key until it has moved the complement of the one unit, viz, eight units of movement.

The principle of this differential mechanism permits it to carry any desired load at any desired velocity, as the cam which is employed to operate the planetary gearing may be designed to bring its shaft to a stop in the limits of its movement as gradually as desired. This mechanism, therefore, obviates all possibility of overthrow or undue strain therein, or in the devices operated thereby.

As above stated, the pivoted members are controlled in their swinging movement toward each other by the keys. Each pivoted member operates a totalizer actuator. The pivoted members of each pair operate segment gears adapted to engage separately with pinions to operate the totalizer actuators, one for the purpose of adding items in the various totalizers and the other for subtracting amounts from the totalizers. These pinions are sleeved to a broad pinion which is constantly engaged with the actuators as the pinions are moved laterally to engage with the segment gears. The totalizer wheels rotate in a common direction for both adding and substracting registration, the actuator pinions being moved laterally into operative connection with the segment connected to the upper pivoted member of the complementary differential mechanism for an adding operation, and to engage with the segment connected to the lower member in a subtracting operation.

Keyboard.

The operating mechanism of the machine is controlled by a plurality of banks of value keys 60 (Figs. 1ᴮ, 2, 4 and 6), a bank of control keys 61 (Figs. 1ᴬ, 8 and 11), and a plurality of banks of department or clerks' keys 62 (Fig. 1ᴬ). The function of the value keys is to control the differential mechanism for operating the totalizing devices, the type carriers and the indicators; the function of the control keys is to control mechanism for adding amounts on the totalizers, for subtracting amounts from the totalizers, and for printing totals or sub-totals from the totalizers; and the function of the department or clerks' keys is to select the different totalizers for operation.

The value keys 60 (Fig. 6) are slidably mounted in key frames 63 and are depressible against springs 64 compressed between shoulders 65 on the keys and a flange on the key frame. A spring is provided for each key, but only one spring is shown in the drawings.

To prevent the depression of more than one key at a time in any bank, the keys are provided with pins 66 which cooperate with disks 67 loosely supported in a groove in the key frame and held in this groove by a key detent 68. The disks are of such size as to permit the depression of only one key at a time.

In order to retain the keys in depressed position during an operation of the machine, the detents are slidably mounted upon studs 69 projecting from the key frame 63, and are provided with a plurality of inclined slots 70 located in the path of movement of the pins 66 on the keys. Therefore, when a key is depressed the detent will move upward against the action of a spring 71 attached thereto and to a pawl 72 loose on a rock shaft 73, supported at its ends in the side frames 74 and 75 of the machine. The purpose of the pawls is to retain the detents and thus the keys in their moved position after the desired elements of the differential mechanism have been released.

Normally the upper end 76 of the pawl 72 engages the upper side of a projection 77 on the detent, and as the key moves the detent upward the projection passes above the upper end of the pawl, which being under spring tension will move under the projection and retain the detent in the moved position until at the proper time during the operation of the machine the pawl will be rocked in a clockwise direction, allowing the spring 71 to return the detent to its normal position and simultaneously the key spring 64 to return the depressed key to its normal position.

Each pawl is provided with a pin 81 cooperating with a bifurcated member 82 fast on the rock shaft 73 to rock the pawl in a clockwise direction to release the key detent. This rock shaft is rocked by an arm 83 (Figs. 1ᴮ and 17), fastened thereto near the center of the machine and provided with a stud 84 to which one end of a pitman 85 is pivotally connected. The other end of the pitman has an elongated opening 86 to guide the pitman on a shaft 87.

Figure 17:
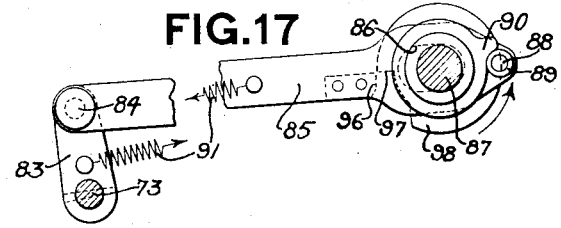
Fig. 17 is a detail view of the key release mechanism.

Carried on a stud 88 (Fig 17) on the pitman 85 is a roller 89 which cooperates with a cam 90 fast on the shaft 87 to move the pitman a sufficient distance to disengage the pawl 72 from the key detent to permit the spring 71 to return the detent to its normal position. The pitman 85 is held in its normal position, as shown in Fig. 17, by a spring 91 attached to the pitman and to the arm 83.

As a key 60 (Fig. 2) is being depressed a block 96 (Fig. 17), fastened to the side of the pitman 85, is moved under a shoulder 97 in a disk 98 fastened to the shaft 87. It can be seen by referring to Fig. 17 that a slight movement of the pitman will position the block to prevent rotation of the shaft 87, and therefore an operation of the machine will be prevented when a key is partially depressed.

This locking device also serves another purpose, and that is to lock the keys against manipulation during an operation of the machine until such a time as the keys would be released had they been depressed before operating the machine. As the shaft 87 (Fig. 17) starts to rotate, the solid portion of the disk 98 will immediately move into the path of the block 96, in which position the member 82 (Fig. 6) will bear against the pin 81 in the pawl 72 and prevent the projection 77 on the detent 68 from moving out of its normal position.

The key detent in each bank of keys controls a latch which normally retains the upper pivoted member 108 of the differential mechanism in an inoperative position until a key has been depressed. Latch 99 (Figs. 2, 4 and 6) cooperates with the differential mechanism of the amount bank, while latch 100 (Figs. 11 and 40) cooperates with the special or control bank differential mechanism. The latch for the department or clerks' banks is of the same construction as the latch 100.

The latch 99 is freely mounted upon a rod 101 supported in the frame of the machine and its upper end is normally held in engagement with a pin 102 (Fig. 6) projecting from the key detent by a spring 103 attached to the latch 99 and a companion latch 104 of the totalizing mechanism of the amount banks, which will hereinafter be described. The latch springs 103 of the control and department banks are connected to the detent as shown in Fig. 40. As a key is depressed and its detent moved, the pin 102 which is in contact with the side of an opening 105 in the latch 99 (Fig. 6) and latch 100 (Fig. 40), which is inclined to the direction of travel of the detent, will cause the latch to swing on its pivot in a counterclockwise direction, thereby disengaging the shoulder 106 from a formed lip 107 on the upper pivoted member 108 of the differential mechanism. As the upper member of the differential mechanism returns to its normal position its lip will cooperate with an inclined edge 109 of the latch and swing the latch on its pivot against the tension of its spring until the lip passes the shoulder 106, when the latch will be raised by the spring into its locked or normal position and remain there until another key is depressed, or until it is operated by the totalizing mechanism, which will hereinafter be described.

When an amount key 60 (Fig. 1ᴮ) has been depressed, the grand total key 115, the grand sub-total key 116, the total key 117 and the sub-total key 118 (Fig. 1ᴬ) are locked in their normal positions so that they can not be operated. Also, by depressing either the grand total key or grand sub-total key, the amount keys, together with the department keys, are automatically locked against operation. In depressing either the total key or sub-total key the amount keys are locked in their normal position, but manipulation of the department keys is permitted. All other keys of the control bank are depressible in connection with any one key of the department bank, together with amount keys.

This interlocking of keys of different banks is accomplished by means of a rod 119 (Figs. 2, 4, 6 and 8), extending through the key frames of the amount banks and the control bank, with formed slots 120 cooperating with shoulders 121 of the key detents 68, and carries near its left hand end an arm 122 (Figs. 8 and 11) having a pin 123 cooperating with shoulders 124 formed in key detents 125 and 126 of the control bank (Figs. 8, 11, 36 and 37). As a key detent 68 of an amount bank is moved by depressing a key 60, the shoulder 121 cooperating with the bottom of the formed groove 120 will cause the rod 119 to rotate in a counterclockwise direction, thereby rocking the arm 122 to place the pin 123 in the path of the shoulders of the key detents 125 and 126 of the control bank and thereby preventing the depression of any totalizing keys.

When any one of the four totalizing keys 115, 116, 117 and 118 (Figs. 36 and 37) is depressed, its cooperating key detent 125 or 126 will be moved upward by its key pin 66 which cooperates with one of the slots 135 and 136 (Fig. 36) and slots 139 and 140 (Fig. 37), to position the shoulder 124 under the pin 123, in which position the rod 119 will be prevented from rocking in a counterclockwise direction. This prevents movement of the key detents in the amount banks through contact of the shoulders 121 with the bottoms of the formed grooves 120 in the rod 119 (Fig. 6). The rod is held in its normal position by a torsion spring 137 (Fig. 1ᴮ), attached to the rod and resting against a pin 138 on the side frame 74.

The other keys in the control bank do not move the key detents 125 and 126 for the reason that their key pins travel in slots the sides of which are parallel with the direction of travel of said pins.

When either the grand total key 115 or grand sub-total key 116 is depressed it is necessary to lock all the keys in the department banks against manipulation. This is accomplished by means of a rod 127 (Figs. 11 and 39) extending through the control and department banks and having fast on its right hand end an arm 128 extending forward and into contact with the lower side of pins 129 and 130 projecting from the keys 115 and 116, respectively. Also fast to this rod, spaced at regular intervals, are arms 131 (Fig. 39), one for each bank of department keys. These arms are normally out of the paths of pins 132 on the key detents 133, but as the rod 127 is given a counterclockwise movement by either of the totalizing keys 115 or 116 they are lowered into the paths of these pins, thereby preventing movement of the key detents 133 and consequently preventing depression of the department keys. A spring 134 attached to one of the arms 131 and the key frame normally holds the arms out of the paths of the pins 132. When a department key is depressed, its pin 132 will move forward under the arm 131, in which position the rod 127 can not be rocked and consequently the totalizing keys 115 and 116 can not be depressed.

There are four control bars and a release detent in the control bank, each performing certain functions, four of which are placed side by side and slidably mounted upon the studs 69 on the right hand side of the key frame 144 (Figs. 8 and 11) and the fifth one on the left hand side, the key frame being supported by the rods 145 and 146.

Each of the key detents of the control bank has its particular function to perform. The release detent 147 (Fig. 40), whose key pin slots are of such inclination as to give the same extent of movement to the detent when any one of the keys in that bank is depressed, unlatches the differential mechanism of the control bank, and unlocks the machine for operation. A spring 148 normally holds the release detent 147 resting upon the lower rod 69, and the upper sides of the slots 149 in contact with the key pins 66. As a key is depressed the release detent 147 is moved upwardly and through the pin 102 rocks the latch 100 in a counterclockwise direction, as has been previously described, and also rocks a lever 150 in a clockwise direction.

The lever 150 is loose on a stud 151 supported in the center frame 152 of the machine. In the forward end of the lever is an elongated opening cooperating with the pin 102 to move its rear end 153 into and out of the path of a shoulder 154 on a disk 155 pinned to the driving shaft 156, the machine being locked against operation until a key in the control bank is depressed.

When a key in the control bank has been depressed all the other keys in that bank are locked in normal position by the release detent 147. As the detent 147 moves upwardly the shoulders 157 pass beneath the key pins 66 on all keys but the one depressed and lock them against manipulation.

The grand and sub-totalizer control bar 125, (Fig. 36) is operated by the grand total key 115 and the grand sub-total key 116 to control the engagement and disengagement of the "grand totalizer" and the actuators at the proper time and connect the actuators with the proper member of the differential mechanism to position the type wheels to print the total or sub-total amount accumulated on the grand totalizer.

The first key pin slot 135 is slightly inclined to the direction of travel of its cooperating key pin so that when the grand total key is depressed the control bar 125 will move upwardly to steps of movement. The control bar 125 has a rearwardly extending arm 158 having an opening 159 cooperating with a pin 160 on an arm 161 mounted on the left hand end of a telescopic sleeve 162. Fastened to the right hand end of this sleeve is an arm 163 to which is connected one end of a link 164, the other end being connected to a segment arm 165 (Fig. 19) loose on a rod 166. The segment arm 165, link 164, and arms 163 and 161 are held in their normal position by a spring 181 (Fig. 8), stretched between a stud on the frame 152 and the stud which forms the pivot for the link 164 on the segment arm 165. The upper part of the segment arm 165 is provided with teeth 167 cooperating with a pinion 168 fastened to a disk 169 loose on a rod 170. As the disk is rotated in a clockwise direction by the segment, a link 171 (Figs. 8, 19 and 43) is automatically connected to the totalizer engaging mechanism. The link 171 is pivoted on a stud 172 on an arm 173 fast on the rod 170 and having its lower end 174 formed to normally engage with a notch 175 in the disk 169 so that when the disk rotates in a clockwise direction the end 174 will be forced out of the notch into contact with the periphery of the disk, moving the link 171 in a counterclockwise direction on its pivot to move the notch 176 formed in the upper end of the link to embrace a pin 177 on a pivoted member 178 which is rocked at the proper time to move the various totalizers into and out of engagement with their respective actuators, which will hereinafter be described.

As the disk 169 is returned to its normal position by being rotated in a counterclockwise direction by the spring 181 when the detent 125 is returned home, the point 174 on the link 171 will engage with the notch 175, causing the lever to assume its normal disengaged position with a notch 179 cooperating with a square pin 180 projecting from the center frame of the machine to retain the rod 170 in its normal position.

The movement of the control bar 125 upwardly two steps also sets up a condition whereby the "grand totalizer" is engaged with the actuators to reset the totalizer wheels to their zero position and then disengaged. This is accomplished by means of a segment lever 186 (Fig. 36) pivoted on a stud 187 supported in the center frame, the upper end of the segment lever having a pin 188 extending into an elongated opening 189 in the control bar 125. A spring 190 attached to the lever and the frame of the machine normally holds the pin 188 in contact with the left hand end of the elongated opening, the lower end of the segment lever having gear teeth engaging with the teeth of a pinion 191 (Figs. 36 and 41) fast to a sleeve 192 freely mounted on a shaft 193.

Figure 41:
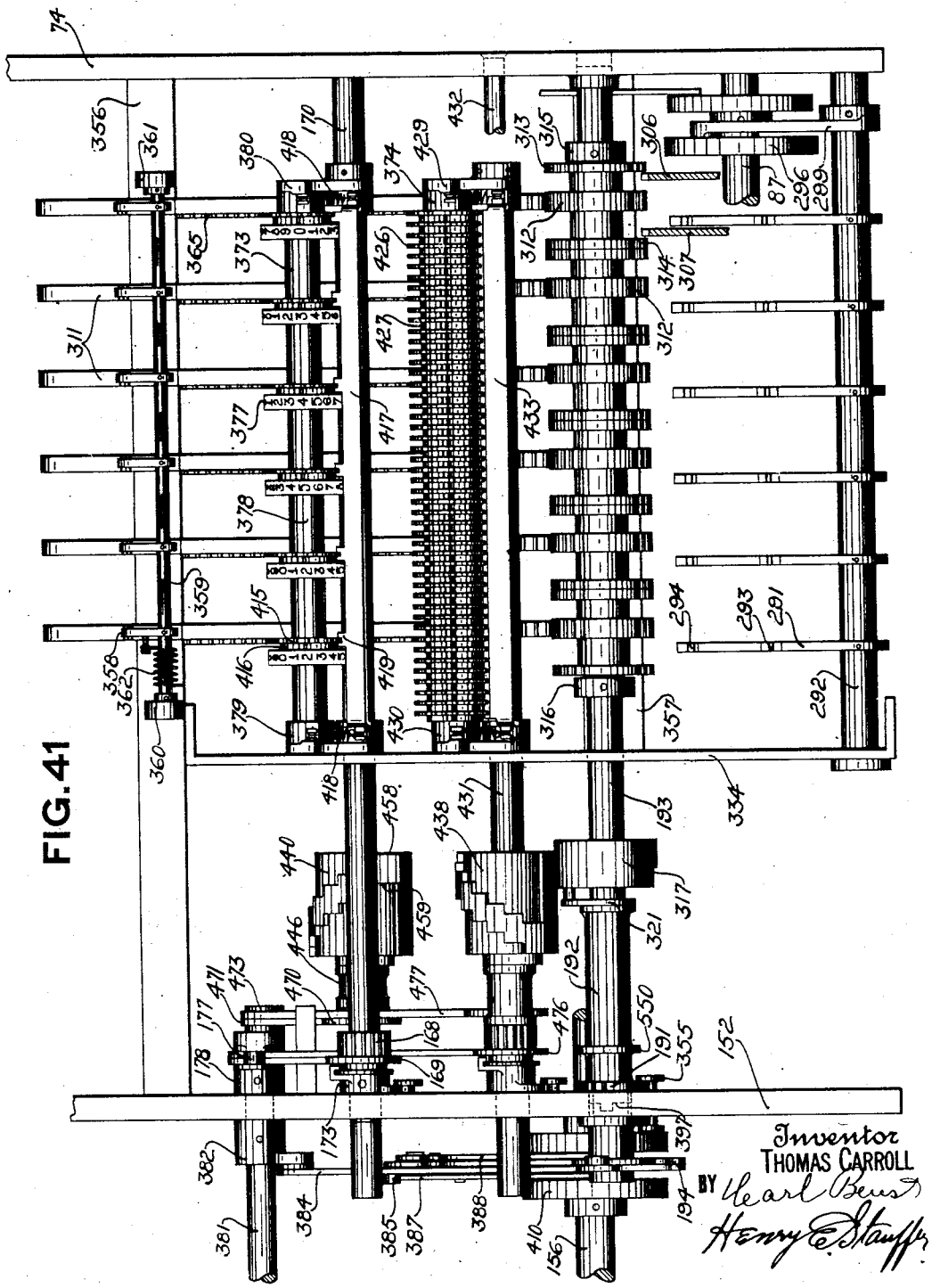
Fig. 41 is a detail front elevation of the grand totalizer, a group of department totalizers and a part of the selecting and operating mechanism for these totalizers.

As the control bar 125 moves upward the pinion 191 will be rotated in a counterclockwise direction to rotate a cam 194 (Figs. 11 and 41) fast to the sleeve 192 to effect a connection between the totalizer engaging mechanism and an operating cam, to position mechanism for operating the differential latch and also to position a differential drum which connects the totalizer actuator driving gear with the proper member of the differential mechanism, all of which will hereinafter be described. The sleeve 192 is made in two sections clutched together at 397 (Fig. 41).

The second key pin slot 136 (Fig. 36) of the control bar 125 is inclined to the direction of travel of its cooperating key pin slightly more than the first key pin slot 135 so that when the second or "grand sub-total" key is depressed the control bar 125 will move upwardly three steps of movement to give a greater rotation to the pinion 191 and the sleeve 192, thereby moving the cam 194 (Figs. 11 and 41) to a position whereby the "grand totalizer" is engaged with the actuators to be moved to the "nine" position for printing the total and then returned to its former position before being disengaged from the actuators.

This additional movement of the sleeve 192 will give the same results with the totalizer actuator driving mechanism and differential latch as the first or "grand total" key previously described.

The other seven key pin slots in this control bar 125 are in line with the direction of travel of their respective key pins so that the control bar will not be moved when these particular keys are depressed. The purpose of the elongation of slots 159 and 189 is to allow the return of the control bar 125 to its normal position at a different time from that when the arm 161 and the segment lever 186 are returned and also to permit the operation of the arm and segment lever by other control bars in the control bank which engage the pins 160 and 188. A spring 195 attached to the control bar 125 and the key frame returns the bar to its normal position when released and retains it there until it is moved upward by a key pin.

The transaction control bar 200 (Fig. 38) controls a grand totalizer and the actuator driving mechanism in cooperation with the cash key 201, rec'd on acc't key 202, paid out key 203 and subtract key 204. The key pin slots 205 and 206 are inclined to the direction of travel of their key pins 66 so that when the cash or received on account keys are depressed the key transaction control bar will move upward one step of movement. Key pin slots 207 and 208 are inclined so as to give two steps of movement to the transaction control bar 200 when the paid out and subtract keys are depressed. All the other key pin slots in this transaction control bar 200 are parallel to the direction of travel of their respective key pins and will permit the transaction control bar to remain in normal position when keys in the control bank, other than those above mentioned, are depressed. The transaction control bar 200 is guided on studs 69 and is normally held in its downward position by a spring 209. The transaction control bar 200 has a rearwardly extending arm 210 having an elongated opening 211 cooperating with the pin 160 mounted in the arm 161 fast on the left hand end of the telescopic sleeve 162 previously described. As the transaction control bar 200 is moved upward by depression of the aforesaid keys it operates the lever segment 165 (Fig. 19) to engage the grand totalizer in the same manner as the grand and sub-totalizer control bar 125 (Fig. 36) does, which has previously been described.

An elongated opening 212 (Fig. 38) cooperates with the pin 188 on the segment arm 186 to rock the segment arm in a clockwise direction, rotating the sleeve 192 (Fig. 41) to select the actuator driving mechanism and select the proper totalizer engaging mechanism. The purpose of the elongation of the openings 211 and 212 is to permit the operation of the members 161 and 186 by other detents without affecting the detent 200.

The department totalizer control bar 126 (Fig. 37), which is also guided on studs 69 and held in its normal position by a spring 213, controls the engaging and disengaging of any one of the department totalizers when taking a total or sub-total record. It also controls the differential latch mechanism and positions the actuator driving mechanism, which will hereinafter be described. The key pin in the total key 117 cooperates with the slot 139, which is inclined to the direction of travel of the key pin to give two steps of movement upward to the key detent when the total key 117 is depressed, and the key pin slot 140 is inclined so as to give three steps of movement to the detent when the sub-total key 118 is depressed.

All of the other key pin slots in this detent are parallel with the direction of travel of the key pins. Therefore the key detent will remain in normal position when any other key except the total and sub-total keys is depressed.

The department totalizer control bar 126 has a rearwardly extending arm 214 having an elongated opening 215 which cooperates with the pin 188 mounted in the segment arm 186, which has previously been described, and as the control bar 125 is moved upward by the depressing of the total or sub-total key this segment arm 186 will be rocked in a clock-wise direction to effect the results previously mentioned.

The control bar 216 (Fig. 15), which is mounted on the left hand side of the control key bank and guided by the studs 69 and held in its normal position by a spring 217, controls the tripping of the transfer in the first bank of the totalizer actuating mechanism when certain keys in the control bank are depressed, the reason for which will hereinafter be explained.

The key pin slots 216, 217, 218 and 219 are parallel with the direction of travel of their cooperating key pins, which allows the control bar 216 to remain in its normal position when any one of these particular keys is depressed. The key pin slots 220, 221, 222, 223 and 224 are inclined to the direction of travel of their cooperating key pins so that when the grand sub-total, cash, rec'd on acc't, charge and sub-total keys are depressed the control bar 216 will be moved upward to rock a rod 225 in a counterclockwise direction and affect the totalizer actuating mechanism in such a way that the tripping mechanism of the first wheel will not be operated, all of which will hereinafter be described.

The rod 225, which is supported by the frame of the machine, is rocked by an arm 226 which is pinned to the rod and extends downwardly and has an elongated slot 227 cooperating with a pin 228 on an arm 229 extending upwardly from the key detent 216.

In each of the three department key banks 62 (Fig. 1ᴬ) there is, in addition to the regular key detent for retaining the keys in their depressed position, and for unlatching the upper differential member for operation, which is the same as that of the amount banks shown in Fig. 6 and which has been fully described, the department totalizer control bar 133 (Fig. 39) for selecting the department totalizer corresponding to the department key depressed and for locking in normal position the grand total and grand sub-total keys when the department keys are depressed.

The first key pin slot 234 is slightly inclined to the direction of travel of its cooperating key pin 66 and will move the bar 133 one step of movement when the first key is depressed. The bar 133 has an upwardly extending arm 235 connected by a stud 236 to an arm 237 mounted on the left hand end of a telescopic sleeve 238 (Fig. 39), a rod 243 or to a sleeve 246 (Fig. 29), which latter sleeve has fastened to its right hand end a companion arm 239 (Figs. 1ᴬ, 8 and 29) connected by a link 240 to a segment 241 pivoted on the stud 166 and cooperating with a pinion 445 to rotate a differential drum 440 one step of movement to select the totalizer corresponding to the first key in the department bank referred to, which selects the department totalizer to be actuated, which will hereinafter be described.

The second key pin slot 242 will move the control bar 133 two steps of movement and consequently the differential selecting drum two steps of movement.

As all the key pin slots in the control bar 133 extend at different angles to the direction of travel of the key pins, so as to move the control bar 133 various distances, the totalizer differential selecting drum will be revolved different extents, corresponding to the key depressed. As with all other control bars, this department totalizer control bar 133 is retained in its normal position by a spring 249.

The department key banks have only eight keys to a bank, whereas the grand total and amount banks have nine keys to a bank. Each bank of department keys cooperates with a separate group of totalizers. The detent of the left hand bank of department keys, numbered from 1 to 8, inclusive (Fig. 1ᴬ), is connected to an arm (not shown) on the left hand end of the rod 243 (Fig. 39) with an arm 244 (Fig. 1ᴬ) fastened to the right hand end of the rod and connected by the link 245 to a differential drum operating mechanism. The detent of the right hand bank of department keys, numbered from 21 to 28, inclusive, is connected by an arm (not shown) attached to the left hand end of a telescopic sleeve 246 (Fig. 39) with an arm 247 (Figs. 1ᴬ and 8), attached to the right hand end of this sleeve and connected by a link 248 to a differential drum operating mechanism.

*Driving mechanism.*

Figure 16:
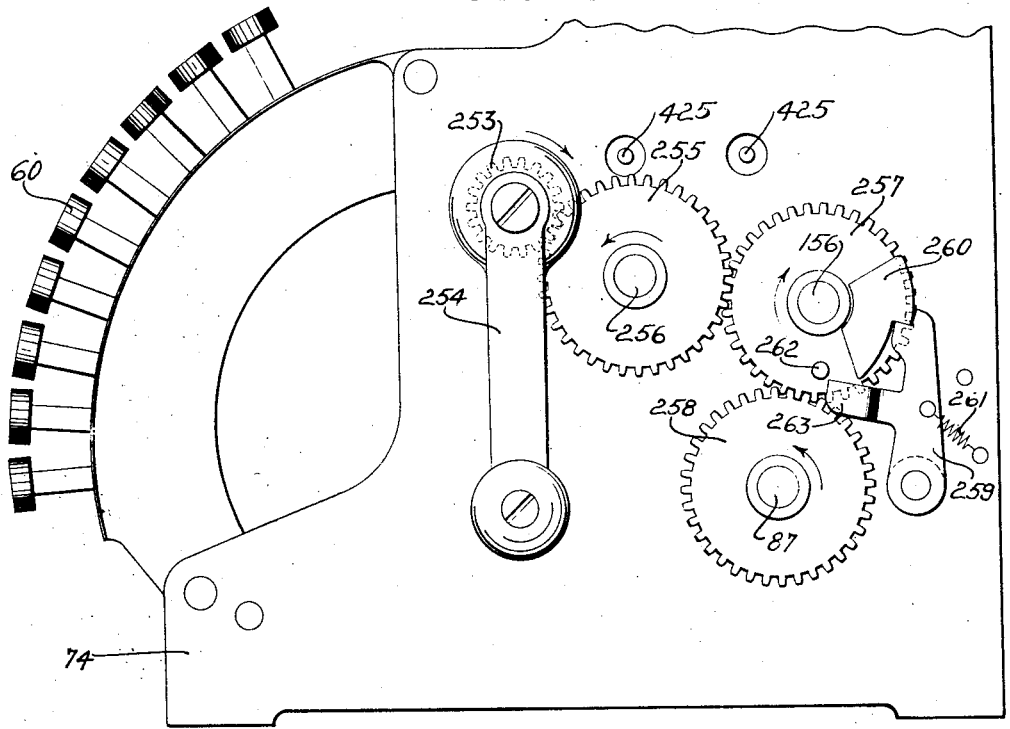
Fig. 16 is a right elevation of part of the machine showing the operating mechanism.
Figure 20:
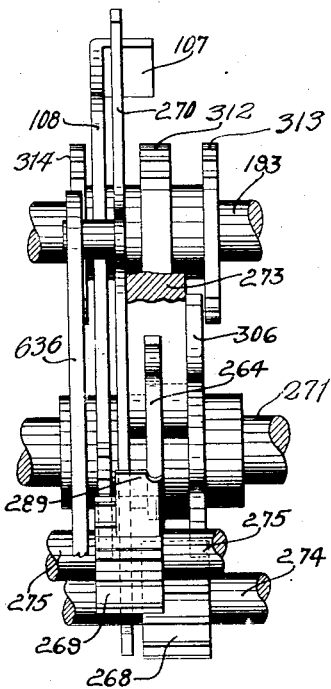
Fig. 20 is a full size detail front elevation of a unit of the differential mechanism.

In Fig. 16 are shown two main drive shafts, 87 and 156, geared to a pinion 253, fast to a crank 254. An intermediate gear 255 pivoted on a stud 256 serves to transmit motion from the pinion 253 to a gear 257 fast to the shaft 156 and a gear 258 fast to the shaft 87. Each operation of the machine requires one rotation of the shafts 87 and 156. Consequently, from the gear ratio shown in Fig. 16 it is necessary to revolve the crank handle twice to effect a single rotation of the drive shafts.

At the end of an operation the driving mechanism is stopped at the proper position by a pawl 259 which is brought into engagement with a shouldered plate 260 riveted to the gear 257. This pawl normally prevents forward rotation of the driving mechanism. The driving mechanism may be released by moving the gear backward slightly, thus causing the shouldered plate to move upward slightly, thereby releasing the pawl, which then moves backward as urged by its spring 261. Then the crank is caused to make two rotations in a forward direction, at the end of which time a pin 262 on the gear 257 strikes a forwardly extending arm 263 of the pawl, rocking the pawl back into stopping position.

Differential mechanism.

Figure 21:
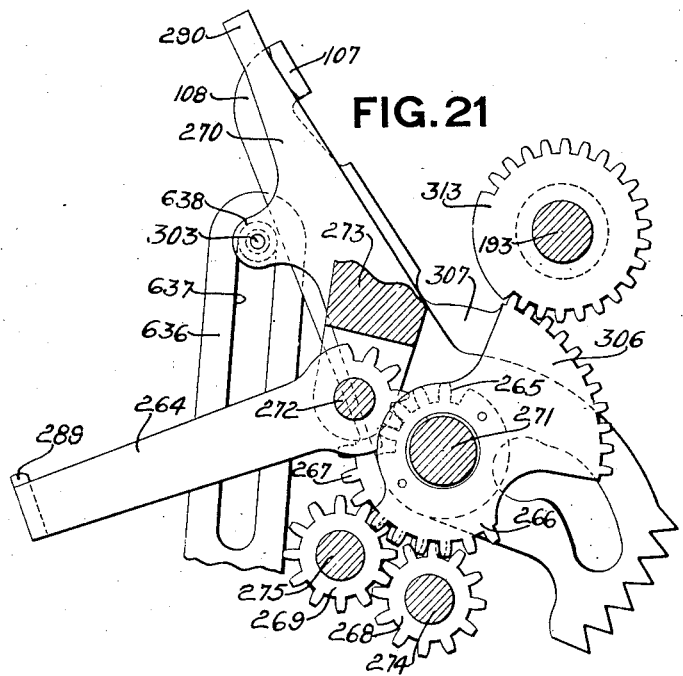
Fig. 21 is a right elevation of the differential mechanism shown in Fig. 20.
Figure 22:
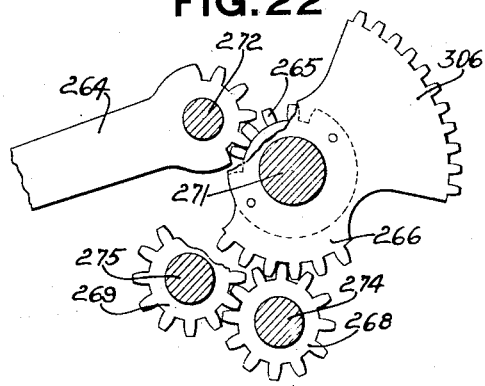
Fig. 22 is a full size detail view of a part of the differential mechanism shown in Fig. 21.
Figure 23:
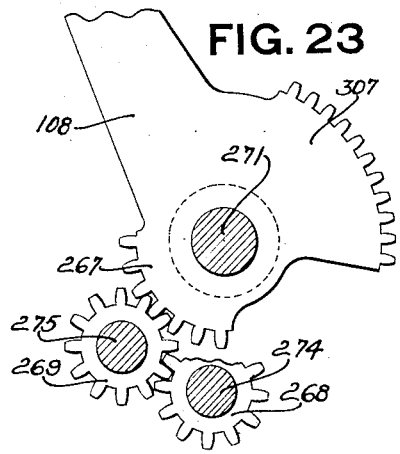
Fig. 23 is a full size detail view of a part of the differential mechanism shown in Fig. 21.

The differential mechanism comprises a plurality of pairs of complementary pivoted members 108 and 264 (Figs. 6 and 21) connected together by segments 265, 266 and 267 with gears 268 and 269. Said members and segments, together with an arm 270, are loosely mounted on a shaft 271 and studs 272 mounted in a bar 273 supported by the framework of the machine.

The pinions 268 and 269 are arranged in two groups, one group for the amount banks and the other group for the control and department banks. The groups of gears for the amount banks (Figs. 2, 4, 6 and 21) are loosely mounted on rods 274 and 275 supported at their ends by arms 276 (Fig. 2) and 277 (Fig. 24) which are pinned to the shaft 271, which has an oscillating motion first in a counterclockwise direction and then clockwise at each operation of the machine.

The group of gears for the control and department bank is loosely mounted on rods 278 and 279 (Fig. 11) supported at their ends by an arm 280 and a companion arm (not shown).

The oscillating motion is conveyed to the shaft 271 by a cam 281 (Fig. 24) fast to the shaft 87 and having a formed groove 282 cooperating with a roller 283 mounted on a stud projecting from a pitman 284 guided by the shaft 87 and pivoted to an adjustable bolt 285 mounted in an arm 286 pinned to the shaft 271. The adjustable bolt which fastens the pitman 284 to the arm 286 passes through an elongated opening in the arm to permit adjustment between the cam and the oscillating shaft so as to vary the leverage to adjust the movement of the shaft. The adjustment is made by first loosening a nut 287 and then turning a screw 288 in either direction, as the requirements may be. The lower portion of the screw engaging the bolt 285 is of a finer pitch than the upper portion which is threaded in the arm 286 thereby permitting very close adjustment of the parts.

Figure 24:
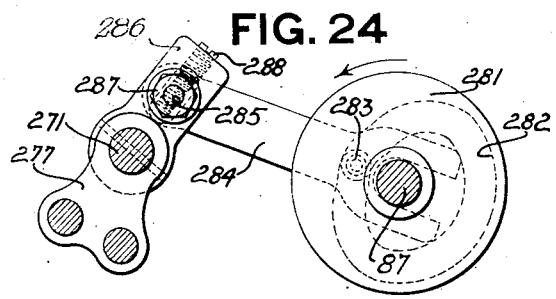
Fig. 24 is a detail view of the differential driving mechanism.

Referring to Figs. 3, 6, 20, 21, 22, 23 and 24, a description of the operation of the differential mechanism will be given. In an operation where none of the keys 60 in a bank is depressed the upper complementary pivoted member 108 corresponding to said bank will be retained in its normal position by the latch 99, and as the shaft 271 and rods 274 and 275 are rocked in a counterclockwise direction by the cam 281, the gear 269 being in mesh with the segment 267, which is a part of the member 108, will be rotated in a counterclockwise direction, causing the gear 268 to rotate in the opposite or clockwise direction, which will move the segments 265 and 266 in a counterclockwise direction. As the teeth of the segment 265 are in mesh with the teeth of the lower complementary pivoted member 264 said member will swing on its pivot 272 a distance equal to nine units of movement. After being maintained in that position for a short period of time by the cam, as shown in Fig. 24, the member 264 will be positively returned to its normal position by the gear mechanism. This operation has not affected the arm 270 for the reason that no key being depressed in that particular bank it did not require moving either the type wheel or the indicator, both of these members remaining in their zero positions.

In an operation where the upper or 1 unit key in any bank is depressed, which causes the lowering of the latch 99, the upper complementary pivoted member will, at the operation of the machine, swing downward or in a counterclockwise direction until the lip 107 contacts with the lower end of the key 60 on the depressed key, which is one division of movement. As this pivoted member is brought to a stop by coming in contact with the key, the segment 267 becomes stationary and during the remainder of the movement of the shaft 271 and rods 274 and 275 in the counterclockwise direction the gears 268 and 269 will move the segments 265 and 266 in a counterclockwise direction, swinging the lower pivoted member upward eight divisions of movement, at which point an ear 289 formed thereon will contact with the depressed key.

As the upper pivoted member is brought downward, its ear 107 is brought into contact with the arm 270, to move said arm downward with said member, thereby moving the printing wheel from the zero position to the 1 unit position, and also causing the indicator to change from the zero position to the 1 unit position. The upper end 290 of said arm is of the same width as the end of the key so that when the pivoted members swing toward each other they will place said arm in line with the depressed key. The arm will not return to the zero or normal position near the end of the operation, as do the pivoted members, but will remain in a position corresponding to the key that is depressed at each operation. It may be moved from the last position to the new position by either one of the pivoted members, depending upon its relative position to the next depressed key.

Referring to Fig. 6, when the last or 9 unit key is depressed, the lower pivoted member will not move and this will cause the upper pivoted member to swing downward together with the arm 270 until the ear 107 contacts with the depressed key, after which the upper pivoted member will return to its normal position, leaving the arm in line with the last key. If at the next operation the fifth or 5 unit key is depressed the lower pivoted member will swing upward, together with the arm, until the ear 289 comes into contact with the depressed key, the upper pivoted arm traveling downward the complement of the full movement, or until the ear 107 contacts with the depressed key.

The arm 270 is normally locked in its different positions by an arm 291 pinned to a rock shaft 292 supported by the side frames of the machine (Fig. 6). This arm projects upward and has two projections 293 and 294 extending to the left to co-operate with the notches 295, formed in a semicircular part of the arm. As there are but five notches 295 in the arm and the arm has ten positions the pawl 291 is so formed that as the lower notch 295 moves upward past the projection 293 the projection 294 will engage with the uppermost notch and from the sixth to the tenth position, inclusive, of the arm 270 the upper projection 294 will retain the arm in its position.

The locking and unlocking of the arm 291 with the arm 270 is effected by a cam 296 (Fig. 4) fast to the drive shaft 87 which is rotated in a counterclockwise direction at each operation of the machine.

Engaging with a formed groove 297 in the cam is a roller 298 loose on a stud projecting from an arm 299 fast on the rock shaft 292. The cam groove is so formed as to disengage the arms 291 from the arms 270 at the beginning of the operation of the machine and retain them in this unlocked position until after the complementary pivoted members have been moved to a position corresponding to the key depressed, when the cam groove will return the locking arms to their locked or normal position.

Projecting laterally from the arm 270 is a stud 303 carrying a roller which engages with an arm for operating a type wheel of the printing mechanism, which will hereinafter be described.

Formed in the lower end of the arm 270 (Fig. 6) is a slot 304 which cooperates with a roller 305 carried by the indicator mechanism to change the indicators from one position to another corresponding to the key depressed. The operation of the indicator mechanism will be hereinafter described.

Attached to and constituting a part of the differential mechanism are two segments which operate the actuator driving gears for the totalizers. One of these segments 306 (Fig. 21) is a part of the segment 266 and is fast to the segment 265 and is controlled by the lower pivoted member and operates the subtracting actuator driving gear. The other segment 307 (Fig. 23) is a part of the upper pivoted member and operates the adding actuator driving gear.

*Totalizing mechanism.*

The totalizing mechanism consists of twenty-four department accumulating totalizers arranged in three groups of eight to a group, and a grand totalizer having visible reading wheels. Items represented by the amount keys are added to and taken away from the department totalizers and grand totalizer by sets of actuating racks operated by the differential mechanism.

For each bank of item or amount keys there is an actuator for adding and subtracting items on the totalizers, and for each numeral wheel in the totalizer over and above the number of key banks, is an actuator for subtracting items from the totalizers.

Each actuator 311 (Figs. 6, 7, 35 and 41) is operated by a gear 312 freely mounted upon the shaft 193 attached to companion gears 313 and 314. The gears are positioned between two collars 315 and 316 pinned to the shaft 193, causing them to move laterally with the shaft which is supported at the ends by the side frames 74 and 152. When amounts are to be added on the different totalizers the gears are moved laterally to the right a sufficient distance to engage the gear 314 with the segment 307, and if an amount is to be taken from the totalizers the gears are moved laterally to the left so as to disengage the gear 314 from the segment 307 and engage the gear 313 with the segment 306.

A step drum 317 (Figs. 8, 27, 28 and 41), freely rotatable on the shaft 193 and held against lateral movement with respect thereto by a screw 318 cooperating with a groove 319 formed in the shaft, transmits lateral movement to the shaft to engage the gears 313 and 314 with the differential mechanism. This drum is given a rotary motion on the shaft by a pin 320 projecting laterally from an arm 321 fast to the sleeve 192 and cooperating with a hole 322 in the drum. The sleeve is rotated by depressing certain keys in the control bank, which has previously been described.

The first position on the drum 317 is represented by the steps 323 and 324 which cooperate, respectively, with lugs 325 and 326 projecting from pivoted arms 327 and 328 (Fig. 25). As the pivoted arms move during each operation of the machine the lugs 325 and 326 will move toward each other until they contact with the steps 323 and 324 on the drum 317, placing the drum in its neutral or first lateral position, if it had been left in another position by a previous operation. In this neutral position the gears 313 and 314 (Fig. 41) are not in engagement with the differential mechanism. Therefore, items registered as in a "charge" transaction will not be added to or taken from the totalizers. The pivoted arms 327 and 328 (Figs. 25 and 26) swing on pins 329 and 330, journaled in a frame 331 supported by the base of the machine. These pivoted members are caused to swing in opposite directions at each operation of the machine by a rocking cam 332 fast to a rod 333 supported by the frame 331 and a plate 334. Also fast to the rod 333 is an arm 335 carrying a roller 336 cooperating with a groove 337 in a disk 338 fast to the drive shaft 87. The groove 337 is of such form that the pivoted members 327 and 328 will, at each operation of the machine, move toward each other, as shown in Fig. 27, and return again to normal position, as shown in Fig. 25.

The rocking cam 332 (Fig. 25) has tapered flanges 339 and 340 formed on its upper end cooperating with the rollers 341 and 342 mounted in the pivoted members 327 and 328, and similar flanges 343 and 344 cooperating with rollers 345 and 346 mounted in the lower end of the pivoted members to give a positive motion to the pivoted members at each operation of the machine.

By depressing either the cash or rec'd on acc't key, the drum 317 will be rotated one division of movement by the segment arm 186, previously described, to place the steps 351 and 352 in cooperative position with the lugs 325 and 326, which will cause the drum to move laterally to the right when the machine is operated and engage the gears 314 with the upper pivoted members 307 of the differential mechanism to add on the totalizers.

The grand total, paid out, subtract and total keys will, when depressed, rotate the drum 317 two divisions of movement, through their respective detents 125, 126, and 200 together with the segment arm 186, placing the steps 353 and 354 (Fig. 28) in cooperative position with the lugs 325 and 326 (Fig. 25), and which will cause the shaft 193 (Fig. 41) to be moved to the left to engage the gears 313 with the lower pivoted members 306 of the differential mechanism and subtract items from the totalizers as previously described.

The grand sub-total and sub-total keys 116 and 118 respectively will, through the detents 125 and 126 and segment arm 186, (Figs. 36 and 37) rotate the drum 317 three divisions of movement, to engage the gears 313 (Figs. 20, 21 and 41) with the lower pivoted members 306 of the differential mechanism to set up typewheels, which are hereinafter described, to positions corresponding to amounts on the grand and department totalizers. The steps 353 and 354 of the drums 317 (Fig. 28) are long enough to cooperate with the lugs 325 and 326 (Fig. 25) when the drum is given three divisions of rotating movement.

The sleeve 192 (Fig. 41), which is freely mounted upon the shaft 193, is retained against lateral movement by a headed stud 355 fast in the frame 152.

The totalizer actuators 311 (Figs. 6, 35 and 41) are vertically extending bars uniformly spaced to cooperate with the driving gears 312 with which they are at all times engaged. These actuators are guided in their movements by slotted horizontal bars 356 and 357 supported at their ends by the frame of the machine.

When the actuators 311 are in their upper or normal position they are retained by spring-pressed pawls 358 pinned to a rod 359 supported at each end by lugs 360 and 361 projecting from the bar 356. A spring 362 is entwined about the rod 359 to cause the pawls 358 to enter notches 363 formed in the actuator bars. These spring actuated pawls are the means for holding the actuator bars in their normal position when the gears 313 and 314 (Fig. 41) are disengaged from the segments 306 and 307 at the time of registering a "charge" transaction.

Each actuator bar 311 contains four separate rack-plates 365, 366, 367 and 368 (Figs. 6, 33, 34 and 35). These rack-plates are freely mounted upon the actuator bars, being held in place by studs 369 which cooperate with slots 370 formed in each end of the rack-plates. These rack-plates are in normal position when the end walls of the slots 370, formed in the upper part of the plates, are in contact with the studs 369. When in this position, spring-pressed plungers 371 (Figs. 33 and 34) engage angle notches 372 formed in the rack plates to retain the plates in this relation to the actuator bars until such time as when a transfer takes place, when these plates will be moved downward to cause the upper end of the lower slot 370 to contact with the lower stud 369. A further description of the transfer mechanism will hereinafter be given. The purpose of the four rack-plates on each actuator bar is to enter items or subtract items from the three different groups of department totalizers and the grand totalizer. The upper left hand rack-plate 365 (Fig. 6) engages the grand totalizer 373. The lower left hand rack-plate 366 engages the group of totalizers 374.

The upper right hand rack-plate 367 engages the group of totalizers 375. The lower right hand rack-plate 368 engages the group of totalizers 376. The engaging of the totalizers with the actuating mechanism is under the control of the keys in the department and control banks, which will hereinafter be described.

The grand-totalizer consists of a plurality of numeral wheels 377 freely mounted upon a rod 378, supported at each end by arms 379 and 380 (Fig. 41) which are pinned to the shaft 170. This shaft is journaled in the side frames of the machine and caused to rock in a clockwise direction to engage the grand-totalizer with the proper actuating racks, and to rock in a counterclockwise direction to place the totalizer in its normally disengaged position, as shown in Fig. 6.

Pinned to the shaft 170 near its left hand end is the arm 173 (Figs. 19 and 41), cooperating with the lever 171 to form a connection to the rocking member 178, which is pinned to a shaft 381 journaled in the frame members 75 and 152. Rocking of the shaft 381 is effected by a selected operating mechanism controlled by certain keys in the control bank. An arm 382 (Figs. 11, 12 and 13), fast on the shaft 381, is freely connected by a stud 383 to a pitman 384, which is guided at its lower end by the driving shaft 156, projecting laterally from the pitman, and is provided on opposite sides with pins 385 and 386 which cooperate with pitman 387 and 388, respectively, to rock the shaft 381 at different times under the control of the keys in the control bank. The pitmen 387 and 388 normally are disengaged from the pins 385 and 386. Rocking of these pitmen into and out of engagement is effected by a pivotal plate 389 freely mounted upon the shaft 156. In the upper part of this plate are laterally projecting pins 390 and 391 cooperating with elongated openings 392 and 393 formed in the pitmen 387 and 388. As the plate is rocked in a clockwise direction the pin 386 will enter a slot 394 formed in the upper part of the pitman 388, coupling the pitman 388 with the pitman 384, causing both pitmen to move in unison during the operation of the machine. Should the plate 389 rock in a counter-clockwise direction the pin 385 would enter a slot 395 formed in the pitman 387 to connect the pitman 387 with pitman 384. In normal position the pin 386, projecting from the pitman 384, cooperates with a formed opening 396 in the plate 389 to prevent a rocking motion of the shaft 381 when the machine is operated, but when the plate is rocked in either direction to couple the pitmen together the form of the opening 396 is such that the pitman can move upward to rock the shaft 381.

The rocking of the plate 389 is under the control of certain keys in the control bank, which when depressed cause a rotary motion of the sleeve 192 and the cam 194. The mechanism connecting the keys with the sleeve 192 has previously been described.

The rotation of this cam to its different divisions of movement positions the rocking plate 389 to connect the pitmen for their proper functioning. Figure 11 shows the cam 194 in position for a "charge" transaction, in which position the plate 389 is held in a neutral position by a pitman 398 pivoted to the lower end 399 of the plate 389. The forward end of the pitman 398 is guided by an elongated opening 400 cooperating with the shaft 193. Two freely mounted rollers 401 and 402 are mounted on the pitman 398 to cooperate with the disk 194 in rocking the plate 389.

When either the cash or rec'd on account key is depressed the disk 194 will be moved in a counterclockwise direction one division of movement and rock the plate 389 in a clockwise direction to engage the slot 394 with the pin 386, coupling the pitmen 384 and 388 together. The pitman 388, having a roller 403 cooperating with a groove 404 formed in a disk 405, will move upward near the beginning of the operation of the machine to rock the shaft 381 and engage the selected totalizers with the actuating mechanism. The form of the groove 404 is such that the totalizers will again be disengaged after the items represented by the depressed keys have been entered.

The depression of the grand total, paid out, subtract or total keys will rotate the disk in a counterclockwise direction two divisions of movement and give the same results as with one division which has previously been described.

The grand-sub-total and sub-total keys when depressed will rotate the cam 194 in a counterclockwise direction three divisions of movement, with a low part 406 of the cam 194 in contact with the roller 401 and the high part 407 in contact with the roller 402, in which position the plate 389 has rocked in a counterclockwise direction, coupling the pitman 387 with the pitman 384. Pitman 387 (Fig. 13), having a roller 408 cooperating with a groove 409 formed in a disk 410, will move upward near the beginning of the operation of the machine to rock the shaft 381, engaging the selected totalizers with the actuators, and retaining them in engagement during both the downward and return movement of the actuators to print a total by turning the totalizer wheels to "9" and then restoring them.

Each numeral wheel of the grand-totalizer has fast to it a gear 415 and a transfer trip cam 416 (Figs. 2, 7 and 41). When the totalizer is in its normal position, as shown in the drawings, the wheels are held rigid by a yoke alining member 417 (Figs. 2 and 41) freely mounted on the rod 170 and held in engagement with the wheels by a spring 418, one end of which is attached to the yoke and the other end to the totalizer arms. This yoke has projections 419 which engage between the teeth of the gears 415 to aline the wheels until they are in mesh with the actuating rack 365. As the rod 170 rocks in a clockwise direction, a rearwardly extending projection 420 on the arm 380 will cooperate with a pin 421 projecting laterally from a vertical plate 422 to move this plate downward against the tension of a spring 423. As the plate moves downward a projection with an angle face 424 will contact with a pin 425 projecting laterally from an upwardly extending arm on the yoke 417 and cause a counterclockwise motion of this yoke to disengage it from the totalizer wheels, which will be after the gears 415 have been partially engaged with the actuating rack 365 (Fig. 6). The disengagement of the totalizer with the actuator permits the plate to return to normal position under the tension of the spring, and the angle 424 (Fig. 2) allows the yoke member to move in a clockwise direction faster than the totalizer moves in the counterclockwise direction to engage the alining yoke with the gears before the gears are entirely out of mesh with the actuating racks. The vertical plate 422 is guided at the top by the bar 356 and at the bottom by the bar 357.

The department totalizers are not reading totalizers like the grand-totalizer, but are accumulating wheels arranged in three groups representing the three banks of department keys. Each group consists of 48 gear wheels 426 (Fig. 7) and transfer trip cams 427 which represent eight departments with a six-wheel capacity for each. Referring to Figs. 6 and 41, the group of totalizers 374 represents the right hand bank of department keys numbered from 21 to 28, inclusive. The accumulating wheels for the totalizer are freely mounted upon the rod 428 (Figs. 7 and 41) supported at its ends by the arms 429 and 430, which are fast on a shaft 431 journaled in the left side frame 152 and supported on the right hand end by a pin 432 projecting laterally from the side frame 74 to cooperate with a hole in the end of the shaft and thereby furnish a bearing which will permit a lateral movement of the shaft without extending outside of the frame 74. In the normal or disengaged position the gears 426 are alined by a yoke member 433 freely mounted upon the shaft 431 and operated in a similar manner to the alining device of the grand totalizer, which has previously been described.

The upper right hand group of totalizers 375 is controlled by the center bank of department keys, numbered from 11 to 18, inclusive, and cooperating with the actuating racks 367 to add and subtract items.

The lower right hand group of totalizers 376 is controlled by the left hand bank of department keys, numbered from 1 to 8, inclusive, and cooperate with the actuating rack 368. The construction of the last two groups of totalizers is the same as that of the first group 374, which has previously been described.

The department totalizers are moved laterally to a position to engage actuators with the totalizer corresponding to the department key depressed. The lateral movement of the totalizers is controlled by step drums 438, 439 and 440 (Figs. 8, 27, 29, 30 and 41), which are freely mounted upon shafts 431, 441 and 442 respectively. While these drums are free to rotate on their respective shafts they are connected to their shafts to move the same laterally by means of a screw 443 (Fig. 30) cooperating with a groove 444 formed in the shaft.

The depression of a department key will cause the drum corresponding to the key bank to rotate to proper position to cooperate with the lateral movement operating device, placing the totalizer in its proper actuating position. Referring to Fig. 29, the segment 241 meshes with a gear 445 which is fast to a sleeve 446 freely mounted upon the shaft 442. Fast to the right hand end of this sleeve is an arm 447 (Fig. 30) which has a laterally projecting pin 448 cooperating with a hole 449 in the drum to rotate the same, and longitudinally slidable therein to permit the drum to move laterally without imparting a similar motion to the sleeve 446. This sleeve is retained in its position on the shaft 442 by means of a flanged hub 450 secured to the sleeve and cooperating with a groove 451 in a lug projecting from an arm 452 held from lateral movement by a screw 453 provided with a head overlapping a projection on the arm.

Each department totalizer stepped drum may be rotated from one to eight divisions of movement by its respective bank of keys. After the drum has been rotated by depressing one of the department keys, the pivoted members 327 and 328 are operated to the position shown in Fig. 27, which will cause the drum to move laterally a distance corresponding to the steps in position to cooperate with the pivoted members. Referring to Fig. 27, the drum 440 has been rotated one division of movement by depressing the first or top key in the center department bank and the pivoted members have been operated placing the projections 456 and 457 in contact with the first steps 458 and 459 on the drum. As these steps are in the same plane with the steps of the normal or home position on the drum there will be no lateral movement to the drum when rotating from the normal to the first position.

When the second department key from the top is depressed, the drum will be rotated two divisions of movement bringing the steps 460 and 461 into cooperative position with the pivoted members, which, as the projection 457 contacts with the step 461 will move the drum to the right until the step 460 comes into contact with the projection 456. This lateral movement of the drum will move the first gear of the department totalizer out of the plane of the actuator and the second gear into the plane of the actuator.

The steps on the drums are of progressive formation so as to place the different sets of gears in cooperative position with the actuators corresponding to the department key depressed.

Projections 462 and 463 (Figs. 26 and 29) cooperate with the drum 439, and projections 464 and 465 cooperate with the drum 438 to move them to their lateral positions. All drums are rotated in a like manner as shown in Fig. 29, each drum having a separate segment connected by a link to an arm rocked by the key detent which has previously been described. Referring to Fig. 8, segment 466 meshes with gear 467 to rotate the drum 438, and segment 468 meshes with gear 469 to rotate drum 439.

Fast to the sleeve 446 (Figs. 30 and 41) is a disk 470 (Fig. 19) which is rotated in a counterclockwise direction by depressing a key in the middle bank of department keys. The rotation of this disk one or more divisions of movement will cause a link 471 to swing on its pivot 472 in a clockwise direction to engage with the stud 473 and couple an arm 474 with the rock shaft 381 to engage the upper right hand group of department totalizers with the actuators. The disk 470 is a duplicate of the disk 169 for the grand totalizer, as also are disks 475 and 476 for the other groups of department totalizers. These disks, as previously explained, have notches which cooperate with projections on the levers to disengage the lever from the studs 177 and 473 when the disks are returned to their normal position. The disk 475, rotated in a counterclockwise direction by depressing a key in the left hand bank of department keys, will cause a link 477 to swing in a clockwise direction to engage with the stud 473 and engage the lower right hand group of totalizers with the actuators.

When a key in the right hand bank of department keys is depressed, the disk 476 will be caused to rotate in a clockwise direction to swung the link 478 on its pivot 479 and engage the link with the stud 177 to engage the lower left hand group of department totalizers with the actuators.

The arm 452 is keyed to the shaft 441 by a square pin 480 which causes the shaft to rock with the arm 452 and permits a lateral motion of the shaft relative to the arm. A similar construction is also used on shafts 431 and 442. A square pin 481 projecting laterally from the frame of the machine cooperates with a shoulder 482 formed on the links 471 and 477 to retain the links in their normal or disengaged position.

The department totalizers are aligned in their disengaged or normal position by mechanism similar to that of the grand totalizer which has previously been described. The department totalizers have an additional alining device to aline the wheels as they are moved into engaged position. The alining device for the lower groups of totalizers comprises plates 483 (Figs. 1$^B$ and 4) supported by rods 484 and 485, each plate having a horizontal projection 486 which engages with seven wheels of a group of eight. One wheel of each set is in position to engage with an actuator and must be free to be actuated when in engaged position. There are seven of these alining plates for the groups of department totalizers with spaces between the alining plates to permit engagement of one wheel of each group with an actuator. The seventh one on the right is required on account of the lateral movement of the totalizers. The upper alining plates 487 supported by rods 488 and 489 are slightly different from the plates 483 in that they aline only one group of totalizers, whereas the plates 483 aline two groups of totalizers.

A transfer from a wheel of lower order to that of higher order in both the grand totalizer and department totalizers is effected by an additional division of movement of the actuating rack. Fast to each totalizer gear wheel is a transfer trip cam 427 (Fig. 7) which is so formed as to operate a pivoted yoke 493 (Figs. 1$^B$ and 7) at each half revolution of the gear. As the high point 494 of the trip cam moves by the point 495 of the pivoted yoke 493, it causes the yoke to move on its pivot 485 in a counterclockwise direction, moving the latch point 496 formed on the left side of the yoke member above the shoulder 497 on a pivoted arm 498. Through the action of a spring 499 the arm 498 will swing on its pivot in a clockwise direction engaging the bevel edge 501 with a notch 502 formed in a plate 503 fast to the actuating rack of the next higher order.

Figure 18:
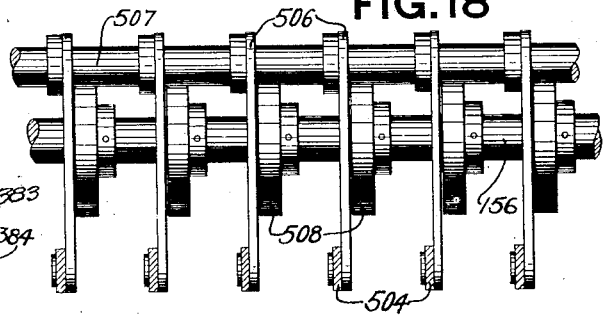
Fig. 18 is a detail top plan view of the transfer cams and arms.

The pivoted arms 498 are freely mounted upon studs 500 which are fast in vertical plates 504 (Figs. 5, 7 and 18) which are bifurcated at their upper ends to cooperate with guide slots 505 (Fig. 5) in the tie bar 356. The lower ends of these vertical plates are pivoted to transfer arms 506 freely mounted upon a rod 507 supported at each end by the frame of the machine. There are six transfer arms, there being one for each actuator cooperating with a cam 508 to lower and raise each vertical plate during the operation of the machine to effect a transfer when one is to take place. Projecting laterally from the transfer arm 506 is a pin carrying a roller 509 cooperating with a groove 510 formed in the side of the cam 508 to rock the arm 506 at the proper time. The cam grooves are so formed in the different cams as to rock the transfer arms in a successive manner well known in the art.

If a transfer is to take place the trip cam in passing from the nine to the zero position, will rock the pivoted yoke 493, releasing the arm 498 of the next higher order which will engage its lower end 501 with a notch 502, and as the transfer cam 508 operates the arm 506 the actuating rack will move downward one division of movement rotating the totalizer wheel a corresponding amount. Near the end of the operation the transfer arms are elevated to a position slightly higher than normal position to cause the bevel edge 511 of the arms 498 to move upward into contact with the pin 573, causing the arms to swing slightly away from the yokes, thereby enabling the point 496 on the yoke to return to its normal position.

If an actuating rack has been moved downward an extra division of movement during a transfer, it is not in its normal relative position with the actuating bar 311 and therefore must be returned before the end of the operation. Referring to Figs. 33, 34 and 35, each rack has an extra wide tooth 515 which cooperates with a shoulder 516 formed on a collar 517 pinned to a shaft 488 journaled in the side frames of the machine. At the beginning of the operation of the machine this shaft 488 is rocked in a counterclockwise direction to move the shoulder 516 out of the path of the rack tooth 515 to enable the rack to move downward. On the return of the actuator bars the rack plate, if a transfer has taken place, will stop with the wide tooth one space below that shown in Fig. 33 and as the shaft 488 is rocked in a clockwise direction near the end of the operation the shoulder 516 will engage the under side of the wide tooth 515 and raise the rack one division of movement higher or to its normal position, where it will be retained by the spring plunger 371.

Rocking of the shaft 488 is effected in the same manner as that of the shaft 485 (Fig. 35), which is rocked by a partial gear 519 pinned to the right hand end of the shaft and cooperating with a vertical rack plate 520 guided at its upper end by the bar 356 and at its lower end by the bar 357. Extending downward from the rack plate 520 is an arm 521 (Fig. 2) carrying a roller 522 cooperating with a groove 523 formed in a disk 524 which is fast on the driving shaft 87. The vertical rack plate 520 will simultaneously return to normal position all actuator racks of any group of totalizers which have been moved to the transferred position during an operation.

An auxiliary mechanism shown in Fig. 5 trips the transfer mechanism in the penny or right hand bank under the control of certain keys in the control bank. An arm 525 freely mounted upon the shaft 507 and carrying a roller 526 cooperating with a groove 527 formed in a disk 528 pinned to the driving shaft 156, will rock first in a clockwise direction and then in a counterclockwise direction at each operation of the machine, to raise and lower a plate 529. The plate 529 is freely connected to the arm 525 by a stud 530 and is guided in its vertical movement by two studs 531 and 532 projecting from a plate 533 through two elongated openings 534 in the plate 529. A spring 535 of sufficient strength to carry the weight of the plate 533 will cause this plate to normally move with the plate 529. The upper end of the spring is attached to the plate 529 and the lower end is attached to stud 532.

The plate 533 is guided at the top by the bar 356 and at the bottom by the bar 357 and has four projecting arms similar to arm 536 each carrying a pin 537 projecting laterally to engage the under side of a trip pawl 538 to move it upward and release a transfer carrying arm similar to the ones previously described. The tripping of the transfer mechanism in the first or penny bank occurs only on the grand total, paid out, subtract and total transactions which will hereinafter be described. When either the grand sub-total, cash, received on account, charge, or sub-total keys are depressed, the shaft 225 is rocked in a counterclockwise direction by mechanism previously described, which moves a horizontal plate 539 to the right a sufficient distance to place an ear 540, projecting laterally from the plate, in the path of the projection 536 and prevent the usual upward movement of the plate to trip the pawls 538 previously described. The horizontal plate 539 is guided at one end by the rod 225 and at the other end by the rod 485 and is given a reciprocating motion by an arm 541 fast to the rod 225, and operatively connected to the plate by a laterally projecting pin 542 cooperating with an opening 543 in the plate inclined to the direction of travel of the plate.

In a grand total transaction the depressing of the grand total key sets up mechanism for engaging the grand totalizer 373 with its actuating rack 365, and also mechanism which will cause the actuator driving gear 312 to be shifted to engagement with the segment 306 which is geared to the lower pivoted member 264 of the differential mechanism. It also rotates the sleeve 192 (Figs. 9 and 10) upon which is mounted a cam 550 cooperating with rollers 551 and 552 carried by an arm 553 loose upon the shaft 156. The rotation of the sleeve causes the arm 553 to move in a clockwise direction, and, by means of a pin 554 on the arm 553, to cooperate with an elongated opening 555 in a pitman 556, thereby raising the forward end of the pitman to engage a slot 557 with a pin 558 on one side of a pitman 559. As the pin 558 enters the slot 557 a projection 560 on the arm 553 will move upward out of alinement with a pin 561 on the other side of the pitman 559. The pitman 556 carries a roller 562 which cooperates with a groove 563 formed in a disk 564 pinned to the driving shaft 156 to rock the shaft 101 when the pitman 556 is coupled with the pitman 559. But when the pitmans are not connected together the projection 560 cooperating with the pin 561 prevents any rocking motion of the shaft 101.

At the beginning of the operation of the machine in a totalizing transaction, the cam 564 (Fig. 10) will cause the shaft 101 (Figs. 6 and 10) to rock in a counterclockwise direction. Fast to this shaft are two arms 565 supporting a rod 566 which engages with the upper pivoted member latch mechanism to normally hold the upper latch 104 out of engagement with the upper pivoted member, and during a totalizing operation to disengage the lower latch 99 at the same time allowing the upper latch to engage the upper pivoted member. The latches are normally held in contact with the rod by the spring 103. The upper latch 104 has a downward and rearward extending arm 567 (Figs. 6 and 7) provided with a slot 568 into which extends a pin 569 on a lever 570 loose on a rod 571. The rear end of the lever 570 is pivoted to an upright plate 572, the upper end of which is guided by the bar 356 as shown in Fig. 1ᴮ. This plate has laterally projecting pins 573 (one for each totalizer line) which, when the plate is moved downward during a totalizing operation, will take a position between a projection 574 on the transfer arm 498 and a lower extending arm 575 of the yoke member 493. In this position the transfer mechanism can not be tripped and the end 495 of the yoke 493 is held in a position to stop the rotation of the totalizer wheel at the nine position. As the plate 572 is lowered a pin 576 projecting from the plate will take a position immediately above the arms 577 and 578. As the point 495 of the yoke 493 moves from the surface 579 of the disk 427 to the shoulder 580 the arm 577 will raise the plate 572 through contact with the pin 576. Raising the plate 572 will rock the lever 570 in a counterclockwise direction which will move the latch member 104 in a clockwise direction to release the upper pivoted member 108. As before mentioned, during total taking operations the gear 313 is moved to the left (Fig. 20) to engage the pivoted member 306, which is secured to the segment member 265 (Fig. 21), meshing with the differential member 264. Since the gear 312 (Fig. 7), which meshes with the rack 311, is stopped when the projection 494 stops rotation of the totalizer element, by coming into contact with the end 495 of the yoke member 493, the pivoted member 264 will also be stopped. As the lower pivoted member 264 is held rigid the upper pivoted member 108 travels downward the complement of the movement of the lower member to position the type wheels corresponding to the amount of the totalizer. There is sufficient space between the end 575 of the transfer trip yoke and the pin 573 to permit the necessary movement of the yoke 493 to raise the plate 572 to unlatch the upper pivoted member.

The totalizer wheels of the highest order are stopped at their nine position during a totalizing operation by an arm 581 (Fig. 42) which functions like the yoke member 493 (Fig. 7) for all other totalizer wheels. A pin 582 mounted in the plate 572 cooperates with a spring 583 to hold the arms 581 in their normal position during the time the totalizers are in their disengaged position.

After the type wheels are locked in position the transfer in the penny bank is tripped allowing that totalizer wheel to move to the zero position which causes a successive tripping of transfers across the entire totalizer bringing all wheels to zero position after which the totalizer is disengaged from the actuators and actuator mechanism returned to normal or zero position.

Figures 14, 15:
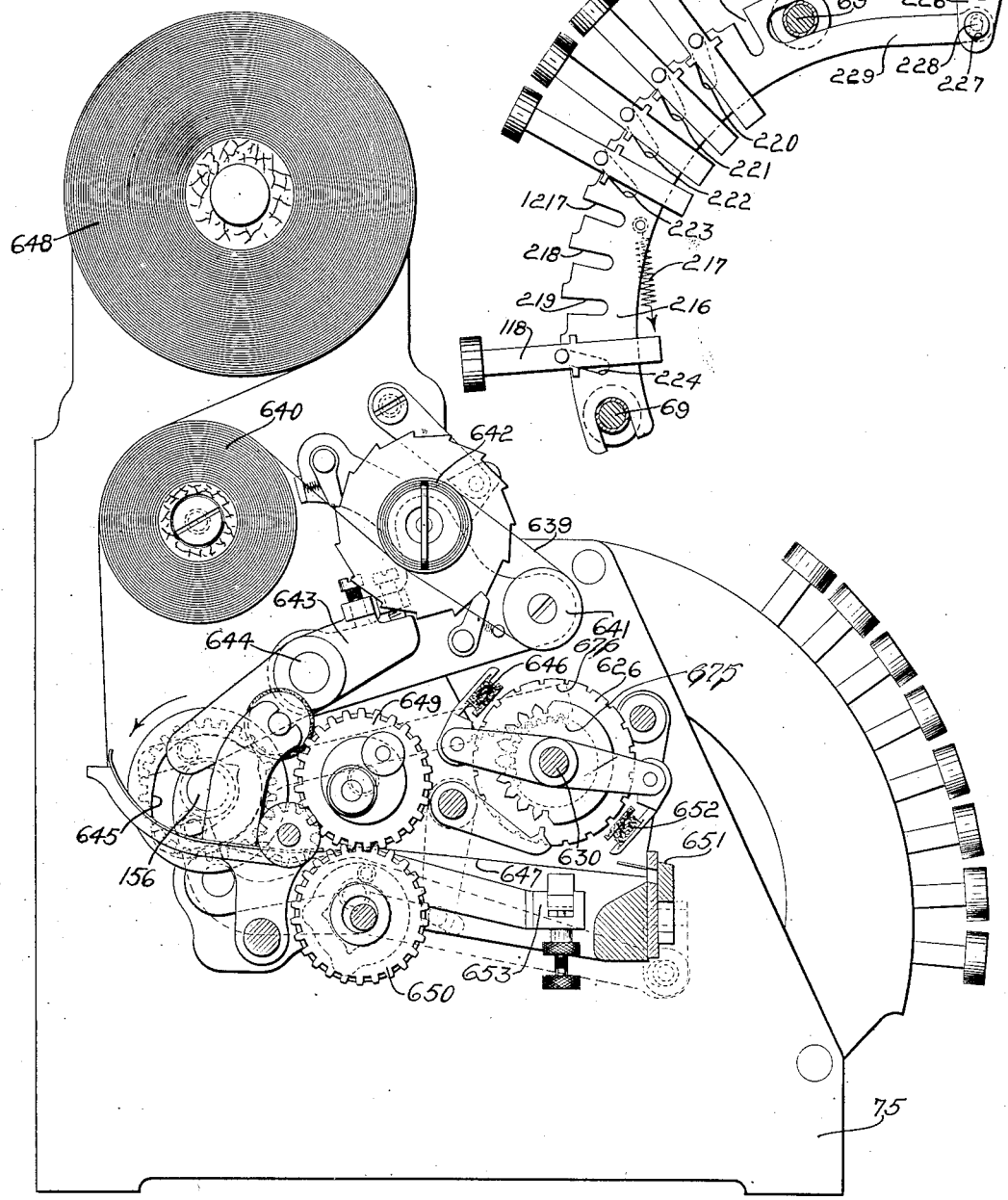
Fig. 14 is an elevational view of the left side of the machine showing the printer.
Fig. 15 is a detail view of a detent plate in the control bank, together with the keys which operate it to prevent the tripping of transfer mechanism of the first bank during certain operations of the machine.

In a grand sub-total transaction the depressing of the grand sub-total key rotates the cam 407 (Fig. 11) in a counterclockwise direction three divisions of movement which connects the totalizer engaging mechanism with the cam 410 (Fig. 13). This cam keeps the totalizer in engagement with the actuators during both their downward and upward movement, so that when the totalizer is disengaged at the end of the operation it will have the same accumulated amount that it had before the operation. Referring to Fig. 15, the grand sub-total key 116 moves the detent plate 216 which rocks the shaft 225 to move the horizontal plate 539 (Fig. 5) to prevent tripping of the transfer in the penny bank. Otherwise the functioning of the parts is the same as that of a grand total transaction which has previously been described.

Figure 19:
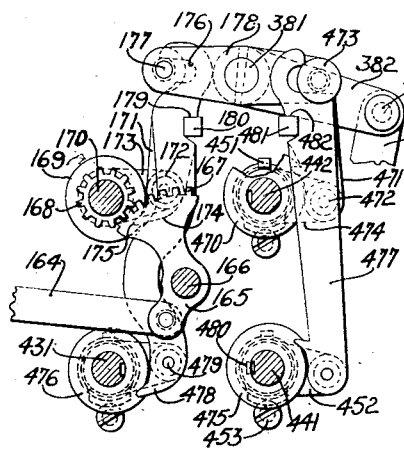
Fig. 19 is a detail view of a part of the totalizer engaging mechanism.

In "cash" and "received on account" transactions, either corresponding key may be depressed in connection with numerous item or amount keys and together with, or without, one of the department keys to add items on the grand totalizer and one department totalizer if a department key should be depressed. The depressing of the department key rotates its totalizer selective drum (Fig. 8) and connects the proper engaging pitman with the totalizer engaging mechanism (Fig. 19). The item keys depressed act as stops for the pivoted differential mechanism which controls the movement of the totalizer actuators, and the cash or received on account key unlocks the machine for operation (Fig. 40), rotates the drum for selecting the actuator driving mechanism (Fig. 41), connects the grand totalizer engaging pitman with the engaging mechanism (Fig. 19), selects the proper engaging mechanism (Fig. 13), and disables the penny bank transfer tripping mechanism (Fig. 5).

The "charge", "paid out" and "subtract" keys, like the "cash" and "received on account" keys, may be used for the grand totalizer in connection with one department totalizer or without the department totalizer.

The depressing of the "charge" key in connection with item keys and a department key disables the penny bank transfer tripping mechanism (Fig. 5), and causes the totalizer engaging mechanism to remain in neutral position as shown in Fig. 11, and the actuator driving gears 313 and 314 to remain in neutral position as shown in Fig. 41.

The "paid out" and "subtract" keys have the same effect upon the totalizer mechanism by taking from both the grand totalizer and one department totalizer the amount corresponding to the item keys depressed. A department key depressed in connection with either of these control keys rotates the totalizer selecting drum and connects the proper totalizer engaging link (Fig. 19) with the engaging mechanism. These control keys set up a condition which causes the actuator driving gear 313 (Figs. 21 and 41) to be moved into mesh with the lower pivoted differential member for subtracting, and the subtracting totalizing engaging pitman 388 into engagement with the engaging mechanism (Fig. 11).

The total and sub-total keys are depressed in connection with a department key to control the operation of the department totalizers in a total and sub-total operation. The department key sets up mechanism for engaging the proper totalizer with the actuating mechanism. The control keys set the selecting drum 317 to cause the actuator driving gears 313 to engage the lower pivoted member of the differential mechanism, rotate the cam 194 (Fig. 11) so as to connect the pitman 388 with the engaging mechanism in a total operation and the pitman 387 in a sub-total operation, connect up the latch mechanism (Fig. 10), disable the penny bank transfer tripping mechanism for a sub-total operation and reset the totalizer wheels to zero position in a total operation, and in a sub-total restore the totalizer wheels to their original position after printing a sub-total.

*Indicating mechanism.*

The differential movement of the arms 270 by the complementary pivoted members will, in addition to positioning the type carriers, control the setting of the indicators in the following manner:

Each of the arms 270 (Fig. 6) has a formed slot 304 cooperating with a roller 305 carried by a lever 586. The lever is pivoted at its rear end to an upright link 587, and has an opening which is concentric with the forward pivotal point to cooperate with the driving shaft 87 to guide the lever in its operation.

Fast to the shaft 87 are sets of cams which, during the operation of the machine, will cause the levers 586 to swing on their rollers 305 as pivots to adjust the indicators. These cams 588 and 589 are placed on opposite sides of the lever 586 and cooperate with the rollers 590 and 591 carried by the lever. The cams are formed to allow the lever 586 to swing on its rear pivot 592 at the time the arm 270 is being positioned by the complementary arms. After the arm is properly positioned and locked by the pawl 291 the cams will engage the rollers and swing the lever on its forward pivot, raising or lowering the rear end of the lever according to the position of the forward pivot and thereby adjusting the indicators.

The upright bar 587 is connected to a stud 593 mounted in a segment 594 which has teeth 595 in its upper edge in mesh with a gear 596 fast to an indicator wheel 597 loose on a rod 598.

The segment 594, which cooperates with the first indicator on the right, is pinned to a rod 599 supported at each end on the side frames of the machine. The upright bar 587 has a rearwardly projecting lug 600 which cooperates with a rod 601 to limit the upward movement of the link 587.

The indicators are retained in the positions in which they are set by alining arms 602 pinned to the rod 601 and having their upper ends 603 formed to engage with notches 604 in the segments 594. There is one of these alining arms for each pair of indicators. They are disengaged from the segments at the time of setting the indicators by an oscillating motion of the rod 601 communicated thereto by an arm 605 (Fig. 2) loosely connected to a pitman 606 guided by the shaft 156. The lower end of this pitman carries a roller 607 cooperating with a groove 608 in the side of a disk 609 fast on the shaft 156.

Referring to Figs. 1<sup>A</sup> and 1<sup>B</sup> the two groups of indicator wheels form four sets of indicators. The two sets shown in Fig. 1<sup>B</sup> are arranged for one set 609 to be read from the front of the machine and the other set 610 from the rear of the machine. These indicators display the amount of the transaction and are controlled by the keys 60. The outside indicator wheels of the sets will be moved in unison by the segments 594 and 611 which are pinned to the rod 599. The second indicator wheels are operated in unison by the segments connected together by a yoke 612. The third wheels are connected together to move in unison by a yoke 613, while the fourth wheels are connected together by a sleeve 614.

The indicators shown in Fig. 1<sup>A</sup> display the department number, together with characters representing the key in the special or control bank. They are arranged with one set 615 to be read from the front of the machine and the other set 616 from the rear of the machine. The outside indicator wheels of the sets will be moved in unison by being pinned to the shaft 598. The second set is connected by a yoke 617 and the third set by a yoke 618. The fourth set is connected by a gear 619.

In the normal condition of the machine when the indicators stand at zero, the parts are in the position shown in Figs. 2 and 6, but when any indicator segment 594 is swung in a clockwise direction by an operation of an arm 270 in the manner previously described, the forward end of the lever 586 is raised while the pivot 592 is held stationary by the engagement of the locking arm 602 with the indicator segment. After the arm 270 is placed according to the key depressed the locking arm 291 will retain it in this position and the indicator segment locking arm 602 will disengage from the segment. The formed slot 304 having been raised to a new position now becomes the fulcrum point. The raising of the pivotal point 305 has also raised the lever and consequently also raised the roller 590, and thus upon continued rotation of the shaft 87 in the direction shown by the arrow the cam 588 will act upon the roller 590 and swing the lever 586 on its forward pivot 305, giving a downward movement to the upright link 587, thereby swinging the indicator segment in a clockwise direction to set the indicator to a position corresponding to the key depressed. As soon as the indicators have thus been set the alining pawls 602 are rocked forward to lock the indicators in such position.

Upon the next operation of the machine if there be no key depressed in this previously operated bank, the arm 270 will be returned to its normal position, which will lower the forward end of the lever 586, and during the operation of the machine the cam 589 will engage the roller 591 and raise the lever 586, restoring the indicator to its normal zero position. If the same key in any bank is depressed during successive operations of the machine the position of the pivotal point 305 will remain unchanged so that the cams 588 and 589 will have no elevating or depressing effect upon the respective rollers, and therefore the indicator will remain in the position in which it was set during the previous transaction. The indicator is moved from one position to another without first returning to zero when different keys are operated during successive operations.

*Printing mechanism.*

Any standard printing mechanism can be applied to this machine. The printer shown in Fig. 14 is of a type well known in the art and is clearly illustrated and described in Letters Patent No. 1,097,703, granted to T. Carroll, May 26, 1914. Therefore, only a brief description will be given here.

The object of the printing mechanism is to print upon record material the amount of transactions, totals and sub-totals, and characters representing both the department and control keys to which the transaction relates.

Referring to Fig. 1<sup>A</sup>, the first three type wheels 626 from the left represent the three department banks of keys. The fourth or character type wheel 627 represents the control bank of keys. The fifth and sixth type printing wheels 628 are used only when totalizing and represent the fifth and sixth totalizer wheels, and the next four wheels 629 represent the four amount banks of keys when registering, and when totalizing they represent the first four totalizer wheels from the right. These type wheels are mounted upon the left hand end of a shaft 630 and telescopic tubes 631 (Fig. 31) which are supported in the left hand side frame 75 and a printer frame cap not shown. Mounted upon the right hand end of the shaft 630 and telescopic sleeves 631 are partial gears 632 (Figs. 31 and 32) which mesh with gear segments 633. These gear segments are mounted upon the left hand end of a shaft 634 and telescopic sleeves 635 which are supported in the frame of the machine. Near the right hand end of the shaft 634 and telescopic sleeves 635 are upright arms 636 each having a slot 637 cooperating with a roller 638 (Fig. 21) which is mounted upon the stud 303 projecting laterally from the arm 270. As the arms 270 are moved to the different positions by the complementary members the type wheels will rotate a corresponding distance bringing into printing position the character to be printed.

Referring to Fig. 14, the type wheels 626 are formed with double series of types located upon diametrically opposite sides of the same whereby an impression of the amount and other characters may be taken both from the top and bottom of said wheels. The upper printing line is used for printing upon the detail strip 639 which is fed from a supply roll 640 around an impression roller 641 and on to a receiving roll 642. The receiving roll is mounted upon a rocking member 643 which is pivoted upon a stud 644, and is rocked twice during each operation of the machine by a cam 645 to ink the type of pressing an ink pad 646 against the type and then pressing the paper 639 against the inked type. The ink pad as shown is in normal position and during the operation of the machine it is moved to the inking position and then returned to normal position by a partial gear 675 and rack 676 operated from the driving shaft 156.

The lower printing line is used for printing upon the issuing receipt 647 which is fed from a supply roll 648, between printing rollers 649 and 650 to a severing knife 651. The lower printing type are inked by a pad 652, and an impression member 653 which cooperates with the ink pad to ink the type also causes a legible impression to be made from the type wheels upon the issuing receipt.

A more complete description of the printing mechanism herein disclosed may be found in Letters Patent No. 792,194, issued to T. Carroll, June 13, 1905.

Operation.

To enter a record of a cash transaction the amount keys representing the amount of the transaction, together with the "cash" key in the control bank, and a key in one of the department banks are depressed, and finally the crank handle 254 is given two revolutions resulting in a rotation of the drive shafts 87 and 156. Rotation of shaft 87 causes the cam 281 (Figs. 6 and 24) to rock the shaft 271 and pinions 168 and 269 in a counter-clockwise direction, thereby causing the pinions 268 and 269 to rotate and swing the members 108 and 264 on their pivots and toward each other, differentially adjusting the arm 270. Either pivoted member may swing toward the other, depending upon the key depressed. In the latter case one will move toward the other until it engages the depressed key when the rotation of the pinions 268 and 269 around the segments 266 and 267 causes the other to take up the complement of movement. In this manner the arm 270 is adjusted in a clockwise or counter-clockwise direction, depending upon its previous setting. Movement of the arm 270 causes the slotted arm 636 to rock and position the type printing wheels to positions corresponding to the different keys depressed, and moves the fulcrum point 305 to a position where it causes the upright links 587 to be moved upward or downward, depending upon their previous position. This movement of the upright link swings the segment 594, which in turn rotates the indicators to display the amount of the transaction together with a character representing the "cash" key and a numeral representing the department in which the transaction was made. As the upper pivoted members 108 of the amount banks move they rotate the totalizer wheels amounts equal to the values of the keys depressed, their movement being transmitted to the totalizer wheels by the actuators 311 and gears 312. The depressing of the "cash" key causes the gear 312 to be connected with the differential mechanism, also the engaging of the "grand" totalizer with the actuators. The depressing of a department key selects the proper department totalizer to be positioned to engage with the actuators so that the amount represented by the depressed amount or item keys will be entered both in the grand totalizer and one department totalizer.

In a transaction where the "received-on-account" key of the control bank is depressed in connection with the keys in the amount banks, and also a key in the department banks the items are indicated, printed and entered in the totalizers similar to when the "cash" key is depressed.

In a "charge" transaction, upon depression of the "charge" key of the control bank in connection with a department key and keys in the amount banks, the items are indicated and printed but are not entered in the totalizers, the totalizer mechanism remaining in neutral position.

In "paid out" and "subtract" transactions, in which amounts are taken from the totalizers, keys corresponding to the amount to be subtracted, a department key and either the "paid out" key or the "subtract" key are depressed. In the operation of the machine the actuator driving gear 313 will engage the segment 306 operated by the lower pivoted member 264 of the differential mechanism. As the actuator 311 is operated by the lower pivoted member 264 there will be entered in each totalizer wheel of the "grand" totalizer and one department totalizer, the complement (of 9) of the key depressed in its corresponding bank. The penny or first transfer trip pawls 538 (Fig.

5) are tripped to engage the carrying arm with the actuator rack and move the rack one additional space. For example, if the totalizer in which there are six wheels has an accumulation of 000563 and we subtract 352 from this amount, the actuator being operated by the lower pivoted member 264, will add the complement, which is 999647, giving a result on the wheels of 000210; the first wheel will then be moved one additional space by the penny or first carrying pawl, making the final result on the totalizer wheels 000211.

To print on record material, the total accumulation on any of the department totalizers and leave the totalizer wheels in the zero position at the end of the operation, the "total" key is depressed in connection with a department key, which automatically locks all the amount keys against operation. The "total" key sets up the drum 317 for engaging the totalizer actuator driving gear 313 with segment 306 operated by the lower pivoted member 264, and positions the cam 550 (Fig. 10) so that during the operation of the machine the regular differential latch 99 (Fig. 6) will disengage from the upper pivoted member and the latch 104 be engaged with this member to cause the lower pivoted member to move upward until the corresponding totalizer wheel is rotated to the nine position, at which point the totalizer wheel is stopped by the yoke member 493 (Fig. 7), and the latch 104 releases the upper pivoted member 108, allowing it to travel downward until it is arrested by the lower member. The movement of both pivoted members has moved the arm 270 to set the type printing wheels to print an amount corresponding to the amount accumulated on the totalizer. After the type printing wheels are set in position and locked by the arms 291 all the totalizer wheels are set in the "9" position. The penny or first transfer pawl having been tripped by the pin 536 (Fig. 5) contacting with the trip pawl 538, will move the actuating rack to rotate the first wheel one division to the zero position, causing the transfer mechanism to operate across the entire six wheels, which places the totalizer at zero, after which the totalizer is disengaged from the actuators, which are then returned to normal position.

In a sub-total operation the amount accumulated on a department totalizer is printed on record material and is retained in the totalizer wheels at the completion of the operation. The operation of the machine is practically the same as during a total operation up to the point where the type printing wheels are set and locked for printing. At this point the tripping of the penny or first bank transfer does not take place and the totalizer does not disengage from the actuator but remains in engagement until the actuators are returned to their normal position, which will leave the totalizer wheels in the position they occupied at the beginning of the operation.

In depressing the "grand total" key to print the total accumulation of all transactions the department keys are locked against operation as well as all amount keys. The operation of the machine is practically the same as during a department total operation except that the grand totalizer cooperates with the actuating mechanism to print the total in place of a department totalizer.

In a "grand sub-total" operation the depressing of the grand sub-total key will lock all department keys as well as the amount keys and set up a condition whereby the grand totalizer will cooperate with the actuating mechanism to print a grand sub-total, the operation of the machine being practically the same as during a department sub-total operation.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a totalizer, manipulative amount determining means, a totalizer actuator, a latch for said actuator under control of said means, and a second latch for said actuator under control of said totalizer, adapted to render the first named latch ineffective when the second latch is rendered effective under control of the totalizer.

2. In a machine of the class described, adapted to make adding and total taking operations, a differentially movable member, a latch for the differentially movable member ineffective during adding operations, total taking mechanism, means operable to prepare the machine for total taking operations to move said latch into effective position for total taking operations, and other means operated by the total taking mechanism to move the latch into ineffective position.

3. In a machine of the class described, the combination of a totalizer, a differentially movable member for driving said totalizer, a latch normally holding said member in normal position, a second latch normally in inoperative relation to said member, means for moving the first latch into inoperative position and the second latch into operative position, and means under the control of the totalizer for moving the second latch into inoperative position to release the differential member.

4. In a machine of the class described involving item entering and total printing mechanism, a differentially movable member, a latch for said member effective before an item entering operation, and a second latch rendered effective and ineffective during a total printing operation, said second latch being adapted to render the first latch ineffective when the second latch is moved to its effective position.

5. In a machine of the class described, the combination of a totalizer, manipulative amount determining means, a differentially movable member controlled thereby, manipulative means for controlling the totalizer, a latch for said member movable to unlatching position by said amount determining means, a second latch for said member, and means controlled by said second mentioned manipulative means for moving said second latch into latching position, said second mentioned latch being adapted to move the first mentioned latch into ineffective position when the second mentioned latch is moved to its effective position.

6. In a machine of the class described, the combination of a differentially movable member, a plurality of latches for said member, one of said latches being normally in latching position and the other in unlatching position, manipulative means for moving said first latch into unlatching position, mechanism for moving said latches to bring the first mentioned latch into unlatching position and the second mentioned latch into latching position, and manipulative means for controlling said mechanism.

7. In a machine of the class described, the combination of a differentially movable member, a totalizer, a plurality of latches for said member, one of said latches being normally in latching position and the other in unlatching position, manipulative means for moving said first latch into unlatching position, mechanism for moving said latches to bring the first mentioned latch into unlatching position and the second mentioned latch into latching position, manipulative means for controlling said mechanism, and means controlled by the totalizer for moving said second mentioned latch into inoperative position.

8. In a machine of the class described, the combination of a differentially movable member, a totalizer, a plurality of latches for said member, one of said latches being normally in latching position and the other in unlatching position, manipulative means for moving said first latch into unlatching position, mechanism for moving said latches to bring the first mentioned latch into unlatching position and the second mentioned latch into latching position, manipulative means for controlling said mechanism, means controlled by the totalizer for moving said second mentioned latch into inoperative position, and means operable to permit the first mentioned latch to move into normal latching position.

9. In a machine of the class described, the combination of a differentially movable member, a plurality of latches for holding said member in normal position, one of said latches being normally effective, and means for normally holding another latch in ineffective position, said means also constituting a means for moving said first mentioned latch into inoperative position.

10. In a machine of the class described, the combination of a plurality of latching elements one of which is normally effective while the other is ineffective, a normally ineffective operating means for making the normally effective latching element ineffective and the ineffective element effective, and manipulative means for rendering the operlatch into inoperative position.

11. In a machine of the class described, the combination of a plurality of control keys, an operating device normally locked in an inoperative position, a device operated at each operation of the machine, and means operated by said control keys for unlocking said operating device and connecting it with said operated device.

12. In a machine of the class described, the combination of a totalizer involving a unit totalizer element, transferring means for introducing a unit into said element, a plurality of keys for controlling the operation of said totalizer, and means under control of said keys for disabling said transferring means.

13. In a machine of the class described, a plurality of totalizers, a rotatable element laterally shiftable for selecting the totalizers for operation, and a plurality of keys for rotating said element different extents to predetermine the extent of lateral shifting thereof.

14. In a machine of the class described, a totalizer, a plurality of sets of totalizer actuators, and laterally shiftable rotatable means for selecting a set of actuators for operating the totalizer.

15. In a machine of the class described, a totalizer, a totalizer actuator, mechanism normally inoperative for engaging and disengaging the totalizer with the actuator, a plurality of manipulative control means, an operating element operating during a certain length of time, a second operating element operating during a different length of time from that of the first operating element, and a means controlled by the manipulative control means for retaining the totalizer engaging and disengaging mechanism in its normal position and when operated by the manipulative control means to connect the totalizer engaging mechanism with either the first or second operating element.

16. In a machine of the class described, having an oscillating member connected to a reciprocating member which is normally inoperative, a driving element operating in a given length of time and held normally out of engagement with said reciprocating member, a second driving element operating in a different length of time from that of the first driving member and normally out of engagement with said reciprocating member, an oscillating member for connecting either the first or second driving member with the reciprocating member, manipulative control means, and a rotating member controlled by said manipulative control means for operating said oscillating member.

17. In a machine of the class described, a plurality of totalizers mounted to slide laterally, a plurality of totalizer selecting means, a rotatable element rotated by said selecting means and formed to give a differential lateral movement to said totalizers, and means having an invariable movement for laterally moving said rotatable element.

18. In a machine of the class described, a plurality of totalizers mounted to slide laterally, a plurality of totalizer selecting means, a rotatable element laterally shiftable for selecting the totalizers for operation, and pivoted means moving in opposite directions for laterally positioning said rotatable elements.

19. In a machine of the class described, a plurality of totalizers mounted to slide laterally, an adjustable member for controlling the lateral movement of the totalizers, pivoted members cooperating with said adjustable member, and positive means for moving said members in opposite directions to laterally position said adjustable member.

20. In a machine of the class described, a plurality of totalizers, a rotatable element, graduated stepped projections on said element, a plurality of keys for rotating said element, and means having an invariable movement and cooperable with said projections for giving a variable lateral movement to said element.

21. In a machine of the class described, a plurality of totalizers, a laterally movable rotatable element for selecting a totalizer for operation, a plurality of keys for rotating said element, and means moving in opposite directions for giving a lateral movement to said element.

22. In a machine of the class described, a plurality of totalizers, a laterally movable rotatable element for selecting a totalizer for operation, a plurality of setting means for rotating said element, and a laterally moving element for moving said rotatable element laterally.

23. In a machine of the class described, a plurality of totalizers, a supporting rod therefor mounted for lateral movement, a totalizer positioning element rotatably mounted upon said supporting rod, a plurality of keys for selecting said totalizers, means intermediate said keys and said positioning element for rotating said element when said keys are operated, and positively operated means for giving lateral motion to said positioning element after being rotated by said keys.

24. In a machine of the class described, the combination of a totalizer including rotatable elements, actuators for rotating said elements in the same direction for both adding and subtracting operations, a differential mechanism having two complementary movable elements, actuator driving means, and manipulative means for connecting the actuator driving means with one complementary movable element to add items in the totalizer, and other manipulative means for connecting said actuator driving means with the other complementarily movable element to subtract items from said totalizer.

25. In a machine of the class described, the combination of a totalizer involving rotatable elements for adding and subtracting items, actuators for rotating said elements, a differential mechanism with two complementarily movable elements, intermediate means for transmitting motion from the differential mechanism to the actuators, a laterally moving element for disconnecting the intermediate means from the differential mechanism to make the totalizer inoperative, and to connect the intermediate means with one complementary element to add items in the totalizer and connect said intermediate means with the second complementary element to subtract items from said totalizer, and manipulative means for controlling the lateral movement of said laterally moving element.

26. In a machine of the class described, the combination of a totalizer for adding and subtracting items, actuators for rotating the totalizer elements, a set of oscillating complementary members, a rotating gear constantly engaged with said actuators, and adapted to engage with said complementary members, manipulative means for controlling the disengagement of said rotating gear from said complementary members, other manipulative means for controlling the engagement of said rotating gear with one of said complementary members to add items in the totalizer, and still other manipulative means for controlling the engagement of said rotating gear with the other said complementary members to subtract items from the totalizer.

27. In a machine of the class described, the combination of a totalizer element operable in the same direction during adding and subtracting operations, an actuator for operating said totalizer element, a set of complementary differentially movable members, and means for connecting either member of said set with said actuator and operable to disconnect both members from said actuator.

In testimony whereof I affix my signature.

THOMAS CARROLL.

CERTIFICATE OF CORRECTION.

Patent No. 1,713,741. Granted May 21, 1929, to

THOMAS CARROLL.

It is hereby certified that error appears in the printed specification of the above numbered patent requiring correction as follows: Page 1, line 54, for the word "of" read "or"; page 2, line 47, for "position" read "positions"; page 5, line 76, for "to" read "two"; page 7, line 22, for the numbers "216, 217" read "1216, 1217"; page 15, line 87, for "of" read "on"; page 18, line 56, for the number "168" read "268"; and that the said Letters Patent should be read with these corrections therein that the same may conform to the record of the case in the Patent Office.

Signed and sealed this 2nd day of July, A. D. 1929.

M. J. Moore,
Acting Commissioner of Patents.

(Seal)

CERTIFICATE OF CORRECTION.

Patent No. 1,713,741. Granted May 21, 1929, to

THOMAS CARROLL.

It is hereby certified that error appears in the printed specification of the above numbered patent requiring correction as follows: Page 1, line 54, for the word "of" read "or"; page 2, line 47, for "position" read "positions"; page 5, line 76, for "to" read "two"; page 7, line 22, for the numbers "216, 217" read "1216, 1217"; page 15, line 87, for "of" read "on"; page 18, line 56, for the number "168" read "268"; and that the said Letters Patent should be read with these corrections therein that the same may conform to the record of the case in the Patent Office Signed and sealed this 2nd day of July, A. D. 1929.

(Seal)

M. J. Moore,
Acting Commissioner of Patents.